US012119214B2

(12) United States Patent
Chen et al.

(10) Patent No.: US 12,119,214 B2
(45) Date of Patent: *Oct. 15, 2024

(54) ION GUIDE WITH VARYING MULTIPOLES

(71) Applicant: AGILENT TECHNOLOGIES, INC., Santa Clara, CA (US)

(72) Inventors: Tong Chen, San Jose, CA (US); Gershon Perelman, Cupertino, CA (US); Curt A. Flory, Los Altos, CA (US)

(73) Assignee: AGILENT TECHNOLOGIES, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/975,493

(22) Filed: Oct. 27, 2022

(65) Prior Publication Data

US 2023/0055007 A1 Feb. 23, 2023

Related U.S. Application Data

(63) Continuation of application No. 17/242,040, filed on Apr. 27, 2021, now Pat. No. 11,515,137.

(60) Provisional application No. 63/046,667, filed on Jun. 30, 2020.

(51) Int. Cl.
*H01J 49/06* (2006.01)

(52) U.S. Cl.
CPC .......... *H01J 49/063* (2013.01); *H01J 49/065* (2013.01)

(58) Field of Classification Search
CPC .............................. H01J 49/063; H01J 49/065
See application file for complete search history.

(56) References Cited

U.S. PATENT DOCUMENTS

| | | | | |
|---|---|---|---|---|
| 7,675,031 | B2 | 3/2010 | Konicek et al. | |
| 8,124,930 | B2 | 2/2012 | Wang | |
| 9,449,804 | B2 | 9/2016 | Bertsch et al. | |
| 11,515,137 | B2 * | 11/2022 | Chen | H01J 49/065 |

(Continued)

FOREIGN PATENT DOCUMENTS

| | | | |
|---|---|---|---|
| GB | 2477393 | A | 8/2011 |
| WO | 2013093077 | A2 | 6/2013 |

OTHER PUBLICATIONS

Baluya, Dodge, et al., "Practical Quadrupole Theory: Resolution and Transmission as a Function of RF Frequency" Ardara Technologies L.P., 57th ASMS Conference on Mass Spectrometry and Allied Topics, May 31-Jun. 4, 2009; 7 pages.

(Continued)

*Primary Examiner* — Nicole M Ippolito
*Assistant Examiner* — Hanway Chang

(57) ABSTRACT

An ion guide includes electrodes elongated along an axis from an entrance end to an exit end and spaced around the axis to surround an interior. The electrodes have polygonal shapes with inside surfaces disposed at a radius from the axis and having an electrode width tangential to a circle inscribed by the electrodes. An aspect ratio of the electrode width to the radius varies along the axis. The electrodes are configured to generate a two-dimensional RF electrical field in the interior having a multipole composition comprising one or more lower-order multipole components and one or more higher-order multipole components and varying along the axis in accordance with the varying aspect ratio, and having an RF voltage amplitude that varies along the axis.

20 Claims, 12 Drawing Sheets

(56) References Cited

U.S. PATENT DOCUMENTS

| | | | |
|---|---|---|---|
| 2010/0308218 A1 | 12/2010 | Wang | |
| 2015/0008320 A1 | 1/2015 | Loboda | |
| 2016/0141167 A1 | 5/2016 | Makarov et al. | |
| 2016/0181080 A1 | 6/2016 | Williams | |
| 2017/0263429 A1 | 9/2017 | Dominguez et al. | |
| 2020/0049660 A1 | 2/2020 | Räther et al. | |

OTHER PUBLICATIONS

Douglas, Donald J. et al, "Linear Ion Traps in Mass Spectrometry," Wiley InterScience (www.interscience.wiley.com) DOI 10.1002/mass.2004; Spectrometry Reviews, 2005, 24; 29 pages.

Gerlich, Dieter, "Inhomogeneous RF Fields: A Versatile Tool for the Study of Processes with Slow Ions," Advances in Chemical Physics Series, vol. LXXXII., 1992; 178 pages.

Kim, Taeman, "Buffer Gas Cooling of Ions in a Radio Frequency Quadrupole Ion Guide: A study of the cooling process and cooled beam properties," Department of Physics, McGill University, Aug. 1997; 198 pages.

Konenkov, A.N., et al, "Spatial harmonics of linear multipoles with round electrodes," International Journal of Mass Spectrometry 289 (2010); pp. 144-149.

Pedder, Randall E., "Practical Quadrupole Theory: Peak Shapes at Various Ion Energies." Extrel Cms L.P., 50th ASMS Conference on Mass Spectrometry and Allied Topics, Jun. 2 to 6, 2002; 8 pages.

Pedder, Randall E., "Practical Quadrupole Theory: Graphical Theory," Extrel CMS L.P., 49th ASMS Conference on Mass Spectrometry and Allied Topics, May 28-Jun. 1, 2001; 5 pages.

Pedder, Randall E., "Practical Quadrupole Theory: Quadrupole Acceptance Characteristics," Ardara Technologies L.P., 52nd ASMS Conference on Mass Spectrometry and Allied Topics, May 24-May 28, 2004; Revised Jul. 1, 2009; 5 pages.

Pedder, Randall E., et al, "Practical Quadrupole Theory: Miniaturization of Rod Diameter, Length, and Frequency," Ardara Technologies L.P., 54th ASMS Conference on Mass Spectrometry and Allied Topics, May 29 to Jun. 1, 2006, 6 pages.

Pedder, Randall, E., "Practical Quadrupole Theory: Quadrupole Emittance Characteristics," Extrel Cms L.P., 51st ASMS Conference on Mass Spectrometry and Allied Topics, Jun. 8 to 12, 2003; 8 pages.

Taormina, Christopher R. et al., "An Ion Guide Study: Quadrupoles, Rectilinear Quadrupoles, Hexapoles, and Octopoles," Ardara Technologies L.P., 56th ASMS Conference on Mass Spectrometry and Allied Topics, May 29 to Jun. 1, 2008; 4 pages.

Extended European Search Report mailed on Nov. 26, 2021 for Application No. 21180659.1.; 12 pages.

* cited by examiner $$\text{Ratio} = \frac{\text{Plate Width}}{\text{Inscribed Diameter}}$$

ION GUIDE WITH VARYING MULTIPOLES

RELATED APPLICATIONS

This application is a Continuation of commonly assigned and co-pending U.S. patent application Ser. No. 17/242,040, filed Apr. 27, 2021, which claims the benefit under 35 U.S.C. § 119(e) of U.S. Provisional Patent Application Ser. No. 63/046,667, filed Jun. 30, 2020, titled "ION GUIDE WITH VARYING MULTIPOLES," the entire contents of which are incorporated by reference herein.

TECHNICAL FIELD

The present invention relates to ion guides, particularly linear (two-dimensional) multipole ion guides, as may be utilized in mass spectrometry systems to guide or transport ions.

BACKGROUND

A mass spectrometry (MS) system in general includes an ion source for ionizing components (particularly molecules) of a sample under investigation, followed by one or more ion processing devices providing various functions, followed by a mass analyzer for separating ions based on their differing mass-to-charge ratios (or m/z ratios, or more simply "masses"), followed by an ion detector at which the mass-sorted ions arrive and are thereby detected (e.g., counted). The MS system further includes electronics for processing output signals from the ion detector as needed to produce user-interpretable data in a format such as a chromatogram or a mass spectrum, which typically presents as a series of peaks indicative of the relative abundances of detected ions (e.g., ion signal intensity such as number of ion counts for each ion detected) as a function of their m/z ratios. The mass spectrum (and/or MS/MS fragment spectrum) may be utilized to determine the molecular structures of components of the sample, thereby enabling the sample to be qualitatively and quantitatively characterized, including the identification and abundance of chemical compounds of the sample (and possibly also isotopologues and/or isotopomers of each compound found in the analysis).

The mass spectrometry technique may be enhanced by coupling it with another analytical separation technique that precedes the MS analysis stage, thus serving as the first stage of analytical separation. Examples include chromatographic techniques such as liquid chromatography (LC) or gas chromatography (GC), and electrophoretic-based techniques such as capillary electrophoresis (CE). In a hybrid LC/MS, GC/MS, or CE/MS system, the separated compounds eluting from the chromatography column or electrophoretic instrument (e.g., a CE capillary) are introduced into the ion source of the MS system, and the MS system processes the separated compounds as summarized above. A hybrid MS system can combine the advantages of the first-stage analytical separation technique (e.g., LC, GC, or CE) and the second-stage analytical separation technique (MS). For example, a hybrid MS system is capable of acquiring three-dimensional (3D) LC/MS, GC/MS, or CE/MS data from a sample, characterized by retention time (or elution time or acquisition time), ion abundance, and m/z as sorted by the MS system. The multi-dimensional MS data is useful for measuring and discriminating among the different compounds of complex samples. For example, two different compounds may co-elute from a chromatography column at about the same time, but because they have different masses they can be subsequently separated by the MS system to avoid overlapping peaks in the data, assuming the MS system operates at sufficient resolution.

An MS system includes one or more ion guides, which typically are configured as linear (two-dimensional) multipole ion guides. Generally, an ion guide has an arrangement of electrodes surrounding an interior space between an ion entrance and an ion exit. The ion guide transports ions through its interior space from a preceding device to a succeeding device of the MS system. For this purpose, the ion guide is configured to generate a radio frequency (RF) field in its interior space effective to focus ions as an ion beam on the central, longitudinal axis of the ion guide. Conventionally, the linear multipole ion guide has multiple pairs of cylindrical electrodes (or "rods") arranged parallel with each other and circumferentially around the common, longitudinal axis. Each pair of electrodes radially opposing each other on either side of the longitudinal axis is electrically interconnected and supplied with an RF voltage potential. The RF voltage potential applied to one or more electrode pairs is 180 degrees out of phase with the RF voltage potential applied to the other, adjacent electrode pair(s). An RF multipole is capable of confining ions in the plane orthogonal to the longitudinal axis due to the corresponding pseudo-potential well induced by the RF electric field, which limits the radial trajectories of the ions and thereby focuses them as a beam on the central axis. For this purpose, the parameters of the RF electric field are set appropriately so that ions of a desired mass range will be stable in the ion guide. In particular, the RF value (i.e., the rapid speed at which the RF electric field changes) and the RF amplitude (i.e., the strength with which the RF electric field pushes or pulls the ions) are set such that the ions will remain focused on the ion guide axis as they travel down the length of the ion guide and will not collide with the ion guide electrodes. At any given time, ions accelerated by the RF electric field toward a certain electrode will quickly thereafter be accelerated toward a different electrode operating at the opposite phase to the first electrode, whereby the time-averaged effect is the on-axis beam focusing due to the (effectively) constant two-dimensional (radial) restoring force imparted by the RF electric field directed toward the axis.

An ion guide may be part of a collision cell. In a collision cell, the electrode structure of the ion guide is enclosed in a housing filled with a "collision" gas (also referred to as a damping, buffer, or bath gas—typically an inert gas such as nitrogen, argon, etc.). The collision cell may function as an ion cooler, which assists in focusing the ions on the longitudinal axis by reducing (damping) their kinetic energy (or "thermalizing" the ions) via collisions with the neutral collision gas molecules (i.e., "collisional cooling" or "collisional focusing"). The collisions cause the ions to lose their kinetic energy and move toward the central, longitudinal axis where the effective potential is minimal. Hence, the collision cell reduces the cross-section of the ion beam and the radial kinetic energy spread of the ions. Alternatively, the collision cell may function as an ion fragmentation device, in which the pressure is high enough (typically several to tens of milliTorr) to ensure efficient ion fragmentation via collisions with the neutrals. That is, in addition to thermalizing the ("precursor") ions, the collision cell may yield "fragment" ions (or "product" ions) by way of collision-induced dissociation (CID, also termed collision-activated dissociation or CAD). In either case, in addition to the RF potential, a direct current (DC) potential gradient in the axial direction is applied across the length of the collision cell to counteract the loss of axial kinetic energy of the ions due to collisions, and thereby address problems attending the kinetic energy loss such as ion stalling in the collision cell. Conventionally, the ion guide electrodes are coated with an electrically resistive material so that a DC potential can be established along the longitudinal axis. Alternatively, the ion guide electrodes are segmented in the axial direction, and DC potentials of different magnitudes are applied to the individual segments to form the axial DC gradient. In some cases, a DC potential barrier may be temporarily applied at the exit end of the ion guide, or additionally to the entrance end, to operate the ion guide as an ion accumulator or ion trap.

It is often desirable that an ion guide, particularly when part of a collision cell, be effective to converge the ion beam passing through its interior space from its ion entrance to its ion exit. That is, the ion guide should provide a large ion acceptance at the ion entrance to maximize the amount of ions captured from the preceding device, and a small ion emittance at the exit to minimize the beam phase space for efficient transfer to the succeeding device, for example when it is desired to transmit ions through a small gas conductance-limiting aperture in front of the succeeding device. One example is an MS system in which the ion source is followed by a quadrupole mass filter or mass analyzer (having four electrodes extending in the axial direction), then a collision cell with a multipole ion guide, and then the (final) mass analyzer such as a time-of-flight (TOF) analyzer. The quadrupole mass filter transfers precursor ions of selected masses into the collision cell, which fragments the precursor ions into product ions via CID. The product ions are then transferred into the final mass analyzer, from which fragment ions of different masses are successively transferred to the ion detector. In such a system, the ion beam entering the final mass analyzer from the collision cell should be of a substantially smaller cross-sectional diameter than the ion beam exiting the quadrupole mass filter and entering the collision cell.

There is an ongoing need for further development in the field of ion guides, including those utilized in collision cells.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, an ion guide includes: an ion entrance end; an ion exit end; and a plurality of electrodes elongated along an ion guide axis from the ion entrance end to the ion exit end and spaced from each other around the ion guide axis to surround an ion guide interior, the electrodes comprising polygonal shapes with respective inside surfaces disposed at a radius from the ion guide axis, wherein: the inside surfaces inscribe a circle on the ion guide axis having the radius; the inside surfaces have respective electrode widths tangential to the circle; an aspect ratio of the electrode width to the radius varies along the ion guide axis; and the plurality of electrodes is configured to generate a two-dimensional RF electric field on the transverse plane orthogonal to the axis in the ion guide interior, the RF electric field comprising a superposition of a lower-order multipole component and a higher-order multipole component wherein an amplitude ratio of the lower-order component to the higher-order component varies along the ion guide axis in accordance with the varying aspect ratio, and the RF electric field having an RF voltage amplitude that varies along the ion guide axis.

According to another embodiment, a collision cell includes: a housing; and an ion guide according to any of the embodiments disclosed herein disposed in the housing.

According to another embodiment, a mass spectrometry (MS) system includes: an ion guide according to any of the embodiments disclosed herein; and a mass analyzer communicating with the ion guide.

According to another embodiment, a mass spectrometry (MS) system includes: an ion guide according to any of the embodiments disclosed herein; and a controller comprising an electronic processor and a memory, and configured to control the steps of a method according to any of the embodiments disclosed herein, in particular to control an operation of the ion guide.

According to another embodiment, a method for transporting ions includes: applying an RF voltage potential to the plurality of electrodes of an ion guide configured according to any of the embodiments disclosed herein, to generate the two-dimensional RF electrical field in the ion guide interior; and admitting the ions into the ion guide interior to subject the ions to the two-dimensional RF electrical field and radially confine the ions to an ion beam along the ion guide axis.

According to another embodiment, a method for analyzing a sample includes: producing analyte ions from the sample; transmitting the analyte ions into an ion guide according to any of the embodiments disclosed herein; and operating the ion guide according to any of the embodiments disclosed herein.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As noted above, the RF electric field generated in the ion guide establishes a pseudo-potential well. The pseudo-potential (or effective mechanical potential) describes the time-averaged effect of the RF electric field in the ion guide. The RF electric field is a composite, or linear superposition, of multipole components of different orders N, which contribute to the total RF electric field to different extents (i.e., some multipole components are stronger than others) and thus influence ion motion to different extents. Some common examples of multipole components include quadrupolar (N=2), hexapolar (N=3), octopolar (N=4), decapolar (N=5), and dodecapolar (N=6) components. The shapes of the pseudo-potential wells corresponding to multipoles of different orders are different. This is illustrated for the quadrupole, hexapole, and octopole components in FIG. 1, which is a plot of magnitude of the pseudo-potential (in arbitrary units, normalized) as a function of radial distance r from the ion guide axis (or "device axis") of the ion guide (in arbitrary units, normalized). The pseudo-potential is related to the radial distance r and the multipole order N as follows:

$$U_{eff}(r) \propto r^{(2N-2)}$$

Figure 1:
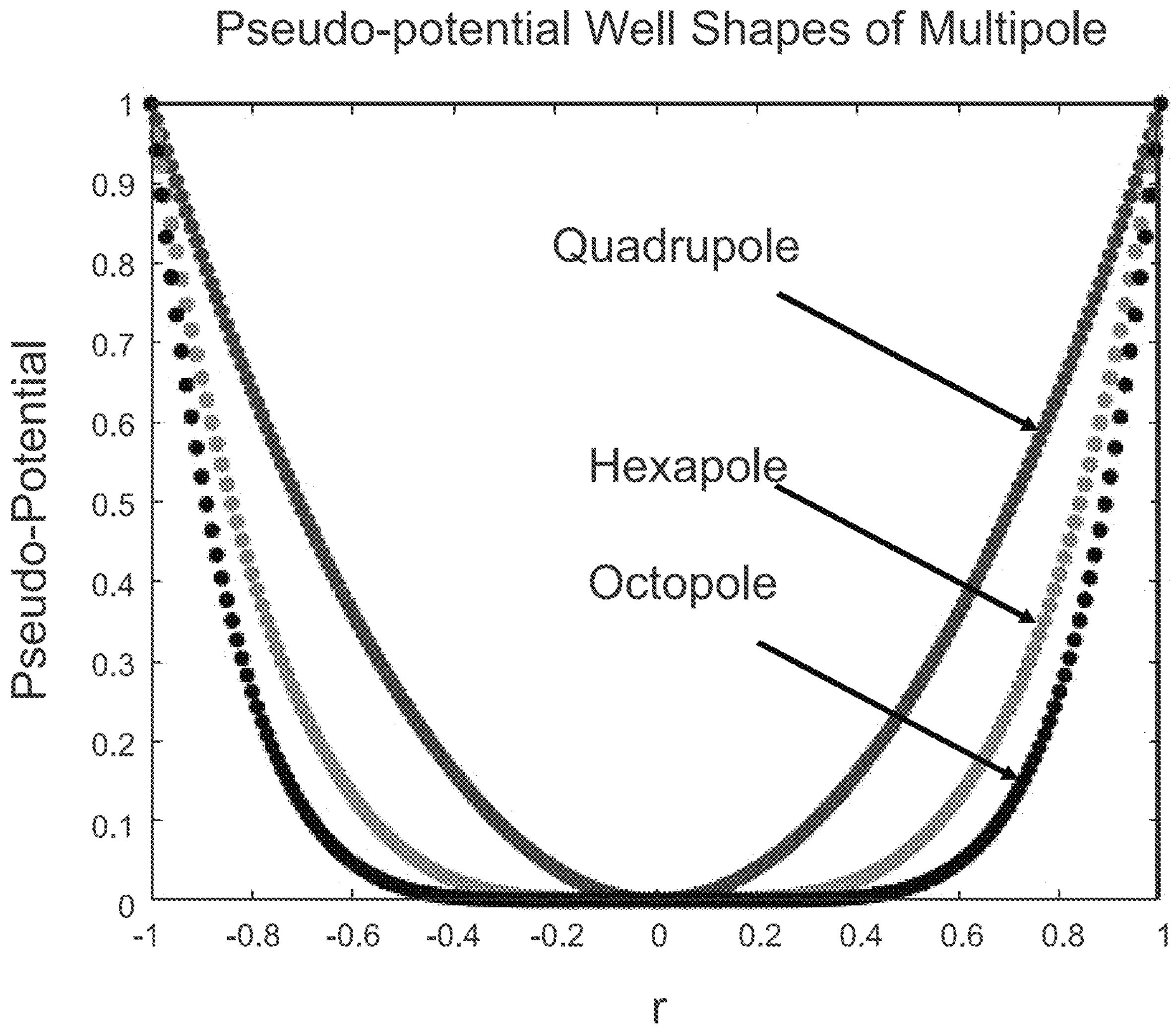
FIG. 1 is a plot of magnitude of the pseudo-potential (in arbitrary units, normalized) as a function of radial distance from the ion guide axis (or "device axis") of a linear multipole ion guide (in arbitrary units, normalized).

This relation results in the illustrated well shape of the pseudo-potential. The pseudo-potential increases with radial position (distance from the ion guide axis r=0). Accordingly, the farther away ions are from the axis, the stronger influence they will experience from the pseudo-potential pushing them back toward the axis. Also, ions near the axis will experience very little of the radial restoring force from the pseudo-potential, i.e., such ions are in the depth of the well. As also shown in FIG. 1, the pseudo-potential wells of multipoles of higher orders have broader bases, i.e., effective potentials that are relatively flatter near the ion guide axis increase more rapidly as the electrodes are approached (i.e., are steeper near the electrodes). In a potential well with a broad base, ions can occupy a larger fraction of the transverse cross-sectional area of the ion guide interior before experiencing a significant restoring force from the pseudo-potential back toward the axis. Thus, a broad-based potential well is advantageous in capturing ions of a larger emittance (such as from a widely diverging ion beam), reducing space-charge forces in the ion guide, and transferring ions of a broader m/z ratio range. At the same time, however, a broad-based potential well is not advantageous for transferring the ion beam through a narrow gas conductance-limiting aperture positioned at the interface between the ion guide and the next device or pumping stage that receives the ion beam from the ion guide (to optimize multistage pumping operation), because many ions of the large beam space will strike the wall surrounding the aperture and thus be lost from the ion workflow. On the other hand, the pseudo-potential wells of multipoles of lower orders have narrower bases, which are advantageous for compressing ion beam diameter (focusing the ion beam) in combination with collisional cooling.

Due to the functional requirements of the collision cell, three primary features should be implemented. First, the effective base of the pseudo-potential well should be gradually narrowed in order to compress the ion beam diameter while reducing the radial kinetic energy spread of the ions, as further facilitated by collisional cooling. Second, the two-dimensional RF electric field for confining ions in the plane orthogonal to the longitudinal ion guide axis (herein referred to as the transverse plane) needs to be varied as the ion beam characteristics (e.g. beam radius, radial energy, etc.) change in the axial (longitudinal) dimension for fulfilling adiabatic requirements, i.e., so that the RF electric field does not transfer excessive heat to the ions. For example, RF heating of the ions may unduly compete with the desired collisional cooling of the ions. The effective pseudo-potential well depth of a multipole ion guide has an analytical solution as:

$$U = \frac{n^2 q V_0^2}{4 m \omega^2 r_0^2}$$

where n is the order of the multipole, q is the charge of the ion in coulombs, m is the mass of the ion, ω is the angular frequency of the applied RF voltage in radians (ω=2f, where frequency f is in Hertz), $r_0$ is the radius in meters of the circle in the transverse plane inscribed by the ion guide electrodes, and $V_0$ is the amplitude of the applied RF voltage in volts (zero to peak).

The adiabatic requirement imposes a low mass cut-off (the smallest ion mass that will be stable in, and thus able to be transferred by, the ion guide) at:

$$m_L = \frac{q}{\omega^2 r_0^2}\left[\frac{2(n-1)}{\eta_{max}}\right]^{\frac{2(n-1)}{n}} (nV_0)^{\frac{2}{n}} (4K)^{\frac{n-2}{n}}$$

where K is ion radial kinetic energy in Joules (J) and $\eta_{max}$ is the characteristic parameter of the adiabatic requirement.

While radially compressing the ion beam by gradually narrowing the pseudo-potential well's base, the RF voltage should accommodate changes in the other parameters so that the adiabatic requirement is fulfilled to maintain the range of m/z ratios that will be transferred by the ion guide. Considerations of adiabaticity are further discussed in Gerlich, D., Inhomogeneous RF Fields: A Versatile Tool for the Study of Processes with Slow Ions, *State-Selected and State-to-State Ion-Molecule Reaction Dynamics, Part* 1: *Experiment*, John Wiley & Sons, Inc. (1992), p. 10-26; the entire contents of which are incorporated by reference herein.

Third, to move ions forward in the axial (longitudinal) dimension under a relatively high-pressure environment (e.g., in a collision cell), a longitudinal electric potential difference (or axial DC potential gradient) needs to be established to compensate for the energy lost in collisions of the ions with neutral gas molecules.

Although RF multipole electrodes are typically of a cylindrical geometry to better approach ideal multipole shapes, RF multipole electrodes of alternative cross-sectional shapes (e.g., rectilinear or other polygonal shapes) possess some other features of interest.

Figure 2:
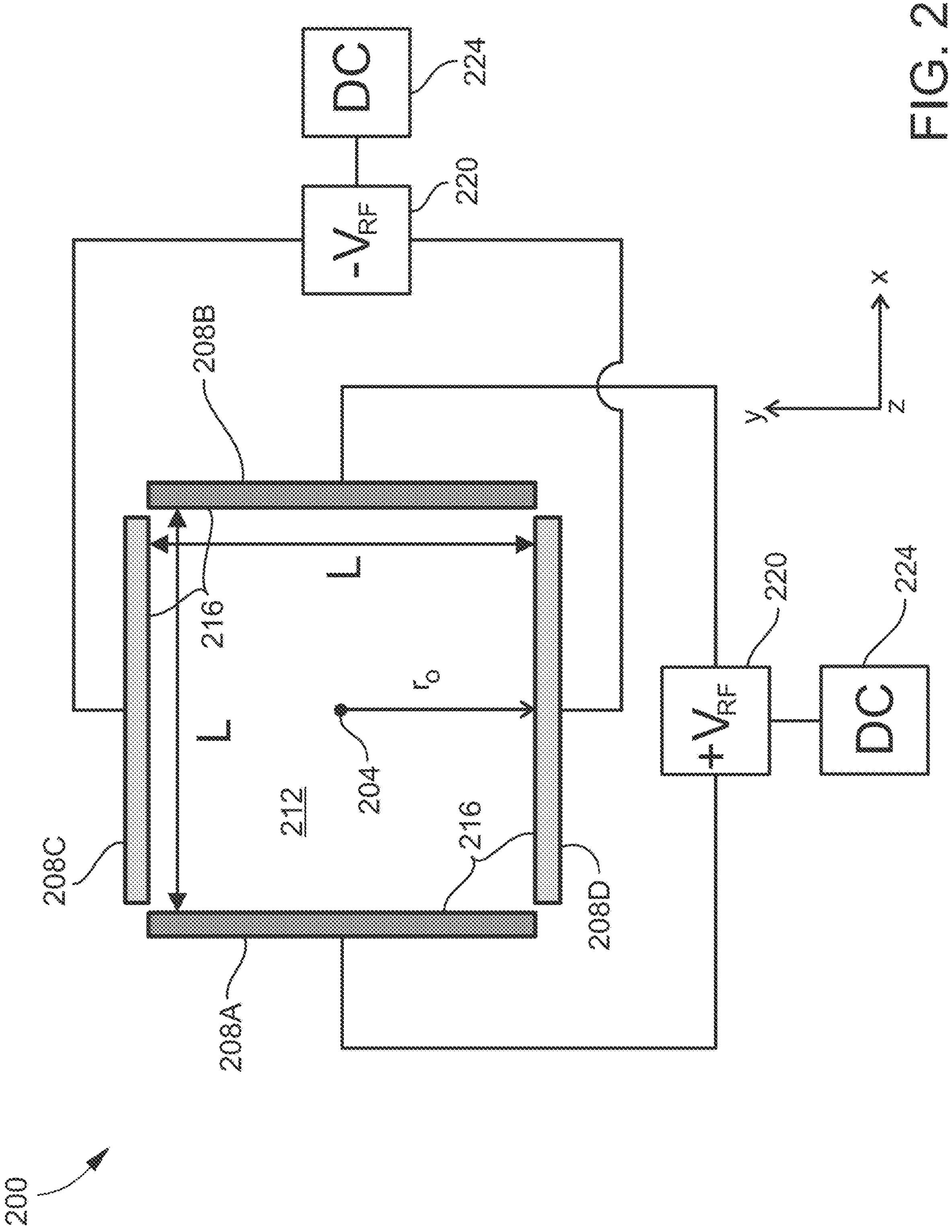
FIG. 2 is a schematic cross-sectional view of an example of an ion guide of rectilinear (e.g., rectangular) geometry according to an embodiment of the present disclosure.

FIG. 2 is a schematic cross-sectional view of an example of an ion guide 200 of rectilinear (e.g., rectangular) geometry according to an embodiment of the present disclosure, taken at some arbitrary point along an ion guide axis (or device axis) 204 of the ion guide 200 between an ion entrance end and an ion exit end thereof. For reference purposes, FIG. 2 includes an arbitrarily positioned Cartesian (x-y-z) frame of reference. In this example, the ion guide axis 204 corresponds to the z-axis, and the transverse plane orthogonal to the ion guide axis 204 corresponds to the x-y plane. In the context of the present disclosure, the term "axial" relates to the ion guide axis 204 or a direction generally parallel to the ion guide axis 204.

The ion guide 200 includes a plurality of electrically conductive ion guide electrodes 208A, 208B, 208C, and 208D elongated along the ion guide axis 204 from the ion entrance end to the ion exit end and circumferentially spaced from each other in the transverse plane around the ion guide axis 204 to surround an ion guide interior 212, which thus likewise is elongated along the ion guide axis 204. The electrodes 208A, 208B, 208C, and 208D are circumferentially spaced from each other typically by equal distances at a given axial position. In some embodiments, however, the circumferential spacing between the electrodes 208A, 208B, 208C, and 208D may vary as one moves along the ion guide axis 204. The electrodes 208A, 208B, 208C, and 208D may be precisely positioned relative to each other, and electrically isolated from each other, in any known manner such as by utilizing electrically insulating structures and fastening elements, as appreciated by persons skilled in the art. The electrodes 208A, 208B, 208C, and 208D have polygonal shapes with respective inside surfaces 216 disposed at a radius $r_0$ from the ion guide axis 204 and facing the ion guide interior 212. In the present example, the electrodes 208A, 208B, 208C, and 208D are planar or plate-shaped with rectangular cross-sections, but generally may have any polygonal or prismatic shape. In the present example, the electrode structure or arrangement of the ion guide 200 is a quadrupole. That is, the ion guide 200 includes four longitudinal electrodes 208A, 208B, 208C, and 208D. In particular, the ion guide 200 includes two electrode pairs, with the electrodes of each pair being diametrically opposite to each other relative to the ion guide axis 204. Thus, in the illustrated example, the ion guide 200 includes a pair of X electrodes 208A and 208B, and a pair of Y electrodes 208C and 208D. In other embodiments, the ion guide 200 may include a greater number of electrodes such as, for example, in the case of a hexapole (six electrodes), an octopole (eight electrodes), or higher multipole. Each opposing pair of electrodes 208A/208B and 208C/208D is spaced from each other at a diameter of $2r_0$, or L as shown in FIG. 2. More generally, in a typical embodiment, the number of longitudinal ion guide electrodes of the ion guide 200 is 2N, where N is an integer equal to or greater than 2.

In some embodiments, the electrodes 208A, 208B, 208C, and 208D are parallel with the ion guide axis 204, such that the radius $r_0$ is constant along the ion guide axis 204. In other embodiments, the electrodes 208A, 208B, 208C, and 208D are oriented at an angle to the ion guide axis 204, such that the radius $r_0$ varies along the ion guide axis 204. That is, the electrodes 208A, 208B, 208C, and 208D may converge toward each other (or diverge away from each other) in a given direction along the ion guide axis 204. In some embodiments, the dimensions (shape and size) of the electrodes 208A, 208B, 208C, and 208D are constant along the ion guide axis 204. In other embodiments, one or more of the dimensions (shape and/or size) of the electrodes 208A, 208B, 208C, and 208D vary along the ion guide axis 204. As shown in additional examples described below, the plurality of electrodes of the ion guide 200 may have a 2N-fold rotational symmetry about the ion guide axis 204 from the ion entrance end to the ion exit end, where again N is an integer equal to or greater than 2. For example, the quadrupole structure shown in FIG. 2 may have a 4-fold rotational symmetry along the entire axial length of the ion guide 200.

The plurality of electrodes 208A, 208B, 208C, and 208D is configured to generate a two-dimensional time-varying (radio frequency, or RF) ion guiding electric field in the ion guide interior 212 (i.e., between the opposing pairs of electrodes 208A, 208B, 208C, and 208D). The RF electric field has a multipole composition of lower-order and higher-order components that varies along the ion guide axis 204 and an RF voltage amplitude that varies along the ion guide axis 204 in a manner described below.

Typically, each opposing pair of electrodes 208A/208B and 208C/208D is electrically interconnected, as illustrated, to facilitate the application of appropriate RF voltage potentials that drive the RF ion guiding field. An RF power supply 220, generally representing appropriate known components (e.g., waveform generator(s), amplifier(s), RF circuitry, etc.), is schematically depicted as including a first RF voltage source $+V_{RF}$ communicating with the first electrode pair 208A/208B, and a second voltage source $-V_{RF}$ communicating with the second electrode pair 208C/208D. To generate the two-dimensional RF electric field(s), an RF voltage potential of the general form $V_{RF}\cos(\omega t)$ is applied to the opposing pairs of interconnected electrodes 208A/208B and 208C/208D, with the potential applied to the one electrode pair 208A/208B being 180 degrees out of phase with the potential applied to the other electrode pair 208C/208D. Generally, from the perspective of the transverse plane of FIG. 2, regardless of how many electrode pairs are provided, each electrode typically will be driven by an RF potential 180 degrees out of phase with the two electrodes adjacent to (on either side of) that electrode. Typically, the absolute value of the amplitude $V_{RF}$ and the frequency $\omega$ of the RF potential will be the same for all electrodes 208A, 208B, 208C, and 208D of the ion guide 200. The basic theories and applications respecting the generation of multipole RF fields for ion focusing, cooling, and other processing are generally known to persons skilled in the art, and thus need not be described in detail here.

Additionally, a DC power supply 224, generally representing appropriate known components (e.g., amplifier(s), DC circuitry, etc.), is schematically depicted as including two DC voltage sources communicating with the electrodes 208A, 208B, 208C, and 208D. The DC power supply 224 via the electrodes 208A, 208B, 208C, and 208D is configured to generate an axial DC potential gradient along the length (ion guide axis 204) of the ion guide 200, an example of which is described below.

The two-dimensional, time-varying electric potential, Φ(x,y), of a rectangular quadrupole such as the ion guide 200 illustrated in FIG. 2 has an analytical solution described by:

$$\Phi=\sum_{n=0}^{\infty}\frac{(-1)^n}{(2n+1)\pi}\cdot\frac{1}{\cosh\left(\frac{2n+1}{2}\right)\pi}\cdot\cos\left(\frac{2n+1}{L}\right)\pi x\cdot\cosh\left(\frac{2n+1}{L}\right)\pi y$$

where n is the order of the multipole, x and y are spatial coordinates in the transverse plane orthogonal to the ion guide axis 204, and $L=2r_0$ is the transverse distance between diametrically opposite electrode pairs 208A/208B and 208C/208D.

The electric potential solution can be expanded by a series of multipole components described by:

$$\Phi=\Sigma_{N=0}^{\infty}A_N\cdot\varphi_N(x,y)$$

where $$\varphi_N(x,y)=\mathrm{Re}[(x+iy)^N]$$

is the Nth order multipole term or coefficient (also termed a spatial harmonic), $A_N$ is the amplitude or strength of the Nth order multipole term $\varphi_N(x,y)$, $\mathrm{Re}[(x+iy)^N]$ is the real part of the complex function $(x+iy)^N$, and $i^2=-1$. Thus, in expanded form to include the first few multipole terms (for quadrupole, hexapole, octopole, decapole, and dodecapole), the electric potential solution can be expressed as:

$$\Phi=A_2\cdot\varphi_2(x,y)+A_3\cdot\varphi_3(x,y)+A_4\cdot\varphi_4(x,y)+A_5\cdot\varphi_5(x,y)+A_6\cdot\varphi_6(x,y)$$

As a few examples, with a parallel arrangement of multipole electrodes spaced symmetrically from the ion guide axis by the radius $r_0$, the quadrupole, hexapole, octopole, decapole, and dodecapole potentials are, respectively:

$$\varphi_2(x,y)=\frac{(x^2-y^2)}{r_0^2}$$

$$\varphi_3(x,y)=\frac{(x^3-3xy^2)}{r_0^3}$$

$$\varphi_4(x,y)=\frac{(x^4-6x^2y^2+y^4)}{r_0^4}$$

$$\varphi_5(x,y)=\frac{(x^5-10x^3y^2+5y^4)}{r_0^5}$$

$$\varphi_6(x,y)=\frac{(x^6-15x^4y^2+15x^2y^4-y^6)}{r_0^6}$$

See further Douglas et al., Linear Ion Traps in Mass Spectrometry, *Mass Spectrometry Reviews*, vol. 24, Wiley Periodicals, Inc. (2005), p. 1-19; and Konenkov et al., Spatial Harmonics of linear multipoles with round electrodes, *International Journal of Mass Spectrometry*, vol. 289, Elsevier B. V. (2010), p. 144-149; the entire contents of which are incorporated by reference herein.

Figure 3:
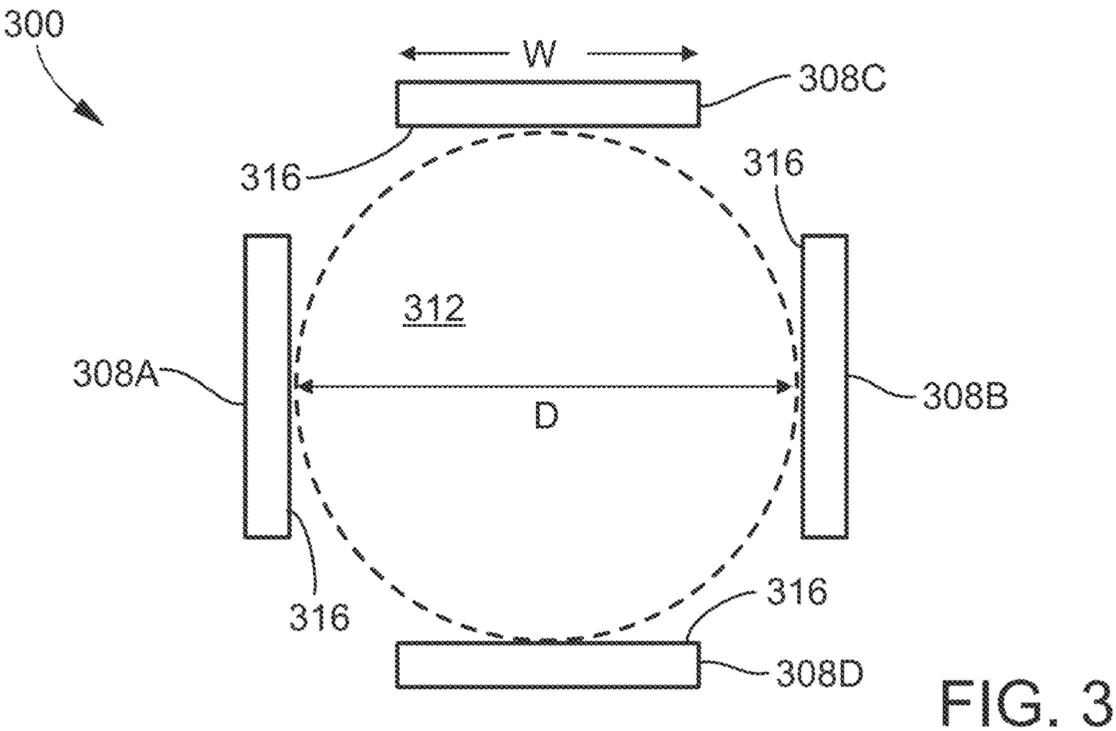
FIG. 3 is a schematic cross-sectional view of another example of an ion guide of rectilinear geometry according to the present disclosure.

FIG. 3 is a schematic cross-sectional view of another example of an ion guide 300 of rectilinear geometry according to the present disclosure. As in the previous example, the ion guide 300 includes two pairs of ion guide electrodes 308A, 308B, 308C, and 308D surrounding an ion guide interior 312, with respective inside surfaces 316 facing the ion guide interior 312. Each electrode 308A, 308B, 308C, and 308D, or at least each inside surface 316 thereof, has an electrode width W in the transverse plane. The electrodes 308A, 308B, 308C, and 308D, or more particularly the inside surfaces 316 thereof, cooperatively inscribe a circle of inscribed diameter D (equivalent to the transverse distance $L=2r_0$ in FIG. 2) in the transverse plane of the ion guide interior 312. The ratio of the (rectangular) electrode width W to the inscribed radius $r_0$, referred to herein as the "aspect ratio" of the rectangular ion guide 300, determines the composition of the multipole electric fields (i.e., the coefficients of multipole components in the expansion of the electric potential). Alternatively, the aspect ratio can be defined as the ratio of the (rectangular) electrode width W to the inscribed diameter D. If, at any axial point along the length of the ion guide 300, the electrodes 308A, 308B, 308C, and 308D each have the same width, the electrode width W utilized for the aspect ratio may be the width of a single one of the electrodes 308A, 308B, 308C, and 308D. Alternatively, the total width of the electrodes 308A, 308B, 308C, and 308D (four in the present example) may be utilized as the electrode width W in the aspect ratio.

Figure 4:
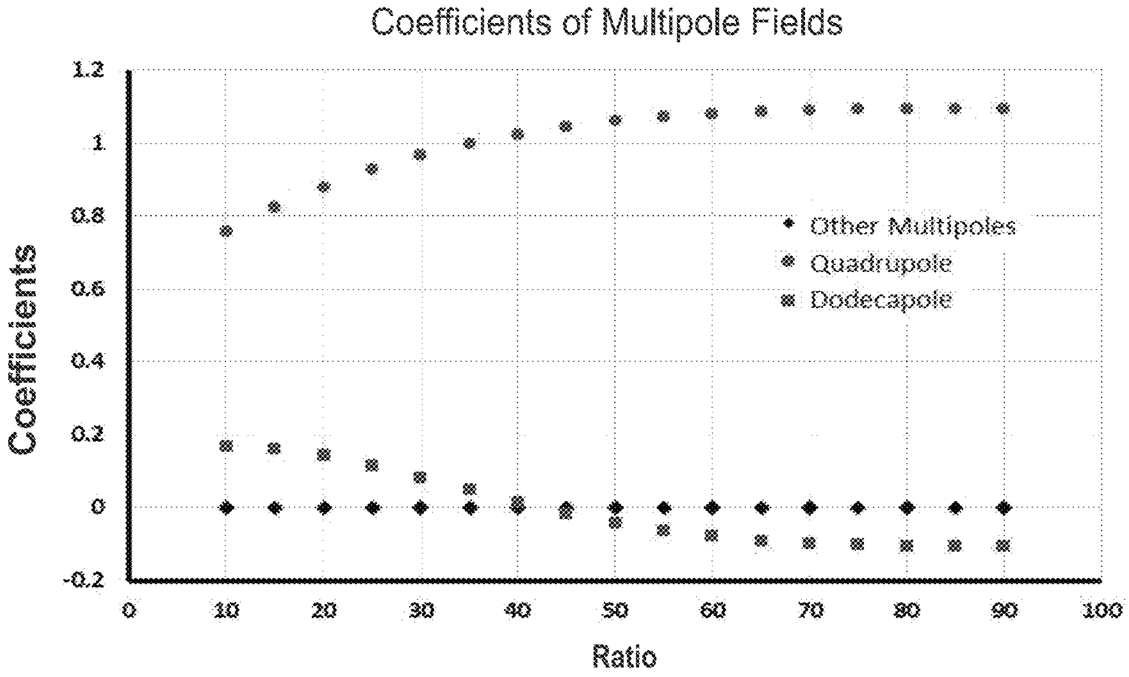
FIG. 4 is a set of plots of different multipole coefficients $\Phi_N$ as a function of an aspect ratio W:D of a linear multipole ion guide.

This fact is illustrated in FIG. 4, which is a set of plots of different multipole coefficients $\Phi_N$ as a function of the aspect ratio W:D. As shown, the quadrupole component $\Phi_2$ is the major or dominant component compared to other higher-order multipole components, and the dodecapole component $\Phi_6$ is the dominant higher-order term. As collectively represented by the data points for "Other Multipoles," the other multipole components such as constant or monopole $\Phi_0$, dipole $\Phi_1$, hexapole $\Phi_3$, octopole $\Phi_4$, and decapole $\Phi_5$ have significantly less contribution to the overall multipole composition of the generated RF electric field. As evident from FIG. 4, as the aspect ratio increases, the quadrupole component of the RF electric field becomes more dominant (or stronger), while higher-order multipole components become less dominant (or weaker). Thus, the ion guide 300 may be configured (i.e., as to the geometry and/or relative position/orientation of the electrodes 308A, 308B, 308C, and 308D) such that the multipole composition of the generated RF electric field varies in the axial direction from the ion entrance to the ion exit of the ion guide 300. As one example, the aspect ratio may increase in the axial dimension, such that the resulting ion beam has a relatively large acceptance at the ion entrance to maximize capturing ions from the preceding device, and converges down to a relatively small emittance at the ion exit to maximize transferring ions to the succeeding device. Alternatively and conversely, depending on the function of the ion guide, the aspect ratio may decrease in the axial direction from the ion entrance to the ion exit such that the ion beam diverges. It can be seen that the aspect ratio may be varied by varying the electrode width W and/or the inscribed radius $r_0$ (or inscribed diameter D) along the ion guide axis, as desired for a given embodiment.

Thus, according to an aspect of the present disclosure, an ion guide (in particular the plurality of ion guide electrodes thereof, typically 2N electrodes) is configured to generate a two-dimensional RF ion confining electric field on the transverse plane orthogonal to the axis in the ion guide interior. The RF electric field is or includes a superposition of a lower-order multipole component (i.e., at least one lower-order multipole component, or one or more lower-order multipole components) and a higher-order multipole component (i.e., at least one higher-order multipole component, or one or more higher-order multipole components). The respective amplitudes $A_N$ of the different multipole components $\Phi_N$ vary in the axial direction (i.e., along the ion guide axis) in accordance with the varying aspect ratio of the electrode structure. In other words, the relative multipole amplitudes of the different multipole components vary in the axial direction in accordance with the varying aspect ratio. Stated in another way, the RF electric field may be characterized as having a multipole amplitude ratio, i.e., the ratio of the amplitude of the lower-order component(s) to the higher-order component(s), and the multipole amplitude ratio varies along the ion guide axis in accordance with the varying aspect ratio.

In the present context, the terms "lower-order multipole components" and "higher-order multipole components" are in general interpreted relative to each other. As one non-limiting example, a quadrupole component, hexapole component, and octopole component may be taken to be lower-order multipole components, while multipole components of higher order than octopole may be taken to be higher-order multipole components, such as a decapole component, dodecapole component, etc.

As a partial example of this aspect of the present disclosure in which just two multipoles are considered for simplicity, FIG. 4 shows that the ratio of the quadrupole (lower-order) amplitude to the decapole (higher-order) amplitude varies as the aspect ratio varies in the axial direction.

According to other aspects of the present disclosure, the amplitude of the applied RF voltage potential, and/or the magnitude of an applied DC voltage potential, may also vary (in particular gradually) along the ion guide axis, as described further below. A few non-exclusive examples of more specific embodiments are described below.

Figure 5A:
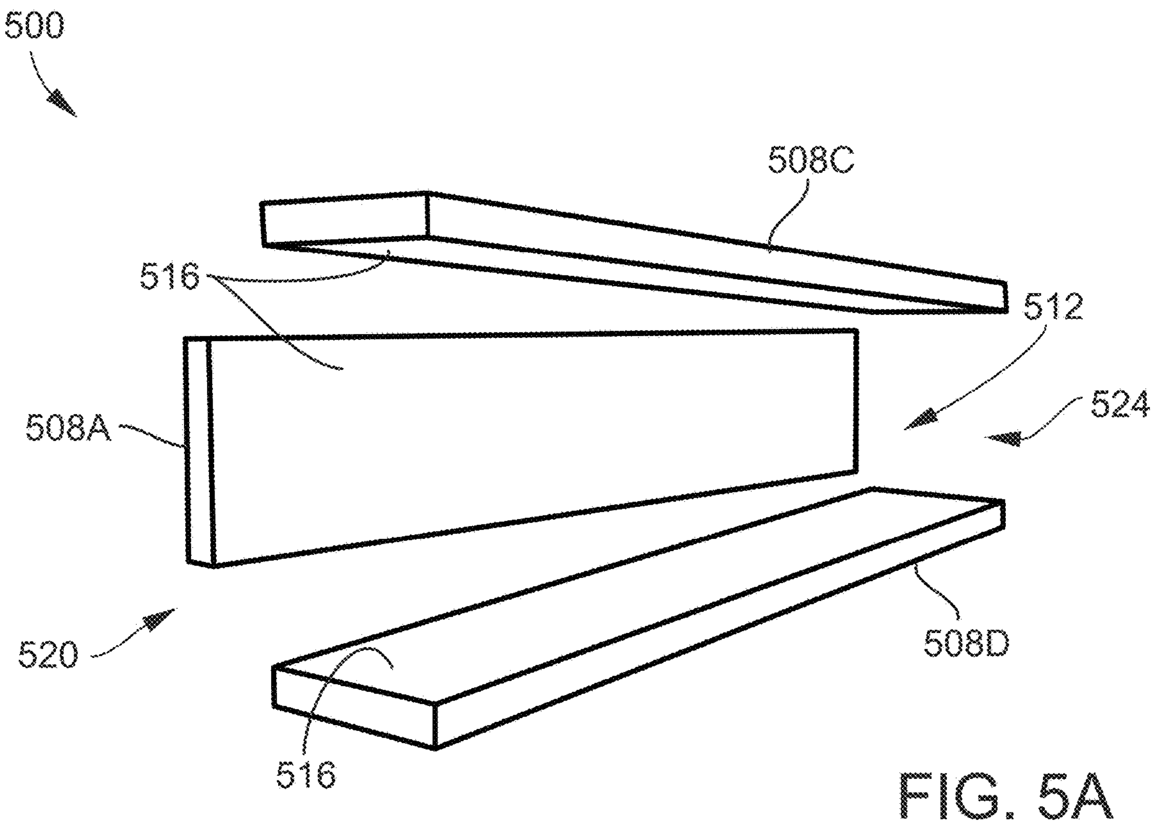
FIG. 5A is a schematic perspective view of an example of an ion guide of rectilinear geometry according to an embodiment of the present disclosure
Figure 5B:
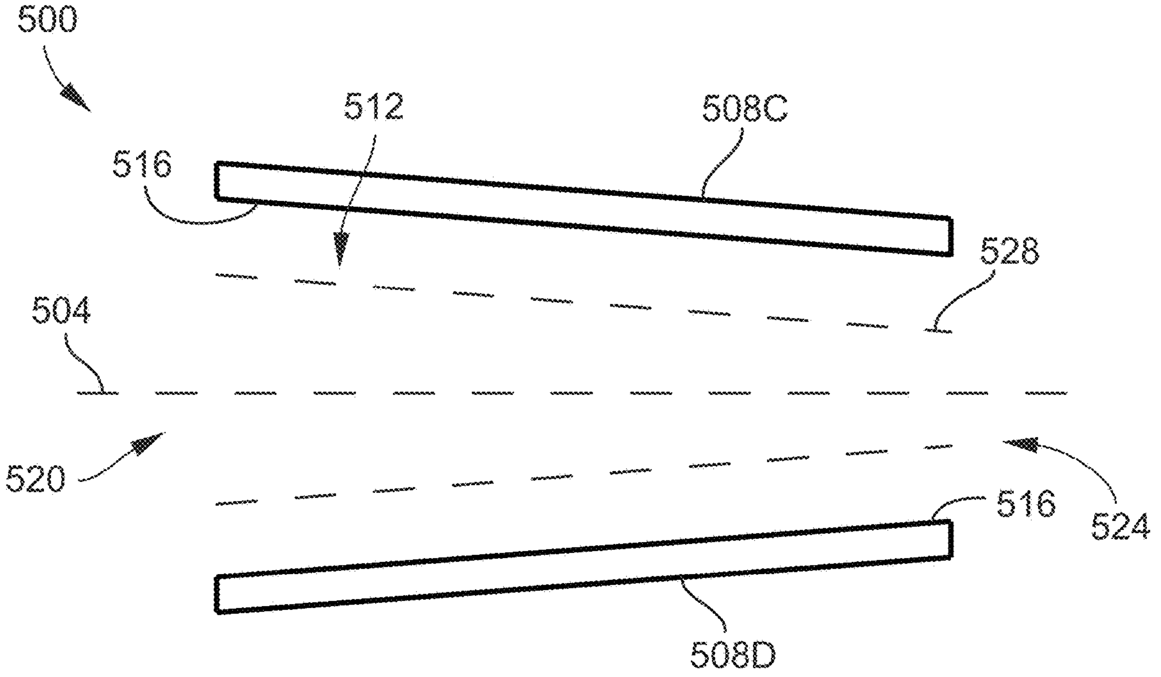
FIG. 5B is a schematic cross-sectional side (lengthwise) view of the ion guide illustrated in FIG. 5A, showing one electrode pair for clarity.
Figure 5C:
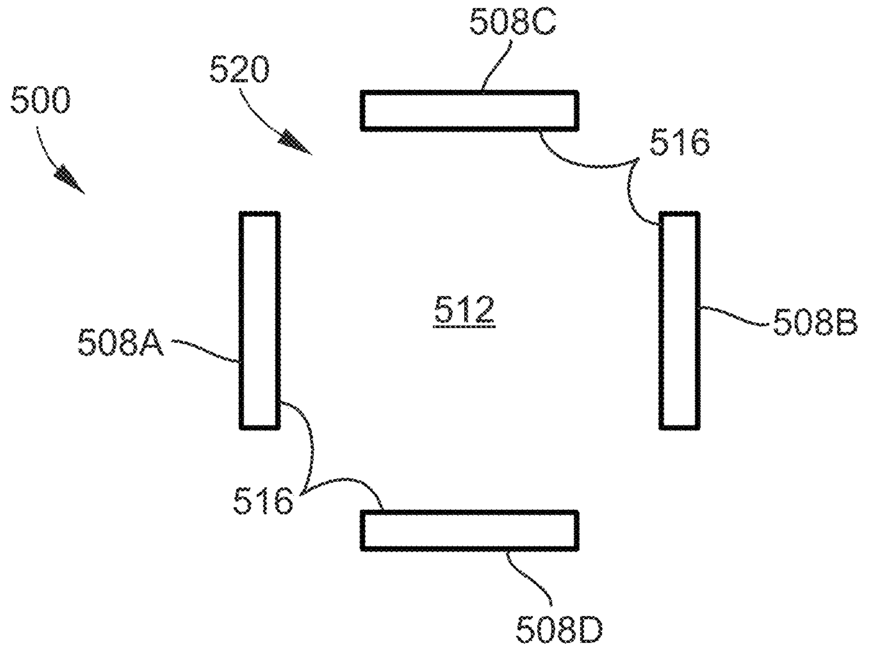
FIG. 5C is a schematic end view of the ion guide illustrated in FIG. 5A at an ion entrance thereof.
Figure 5D:
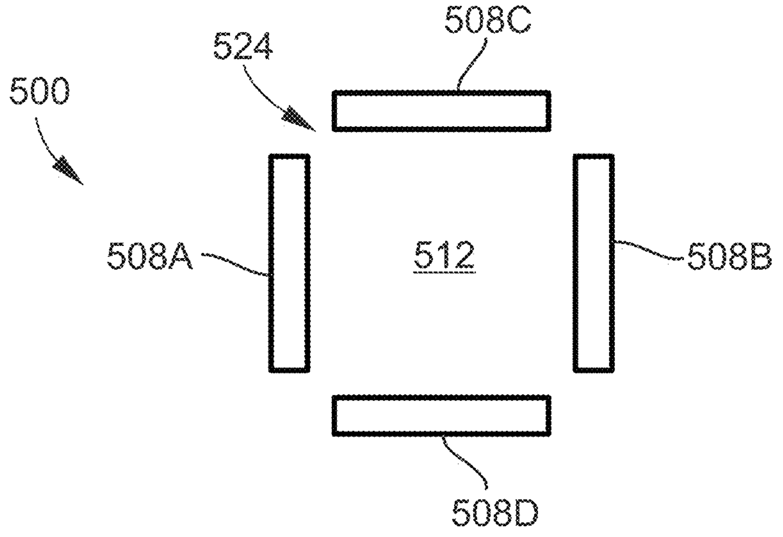
FIG. 5D is a schematic end view of the ion guide illustrated in FIG. 5A at an ion exit thereof.

FIG. 5A is a schematic perspective view of an example of an ion guide 500 of rectilinear geometry according to an embodiment of the present disclosure. As in the previous examples, the ion guide 500 includes a plurality of ion guide electrodes 508A, 508B, 508C, and 508D elongated along an ion guide axis 504 and circumferentially spaced from each other in the transverse plane around the ion guide axis 504 to surround an axially elongated ion guide interior 512, which extends from an ion entrance (end) 520 to an ion exit (end) 524. The electrodes 508A, 508B, 508C, and 508D have respective inside surfaces 516 facing the ion guide interior 512. In FIG. 5A, one of the electrodes (508B) is not shown for clarity. FIG. 5B is a schematic cross-sectional view of the ion guide 500, showing one electrode pair for clarity. FIG. 5C is an end view of the ion guide 500 at the ion entrance 520, and FIG. 5D is an end view of the ion guide 500 at the ion exit 524.

In the present embodiment, the electrodes 508A, 508B, 508C, and 508D (or at least their inside surfaces 516) are oriented at an angle to each other relative to the ion guide axis 504 (i.e., are tilted or tapered toward each other) such that they converge toward each other in the axial direction from the ion entrance 520 to the ion exit 524. Accordingly, the inscribed radius $r_0$ of the electrodes 508A, 508B, 508C, and 508D gradually decreases along the ion guide axis 504. Also in the present embodiment, the electrode width W (at least the width of the inside surface 516) remains constant along the ion guide axis 504, while the circumferential gap between adjacent electrodes 508A, 508B, 508C, and 508D in the transverse plane gradually decreases along the ion guide axis 504. In FIG. 5A, the electrode width W appears to be tapered, but this is due only to the three-dimensional perspective view. Consequently, the aspect ratio increases in the axial dimension according to a predefined function or pattern, which in the present example is linear while in other embodiments may be nonlinear. By this configuration, the higher order (e.g., N>2) multipole components of the generated RF electric field are greater at the ion entrance 520 and gradually decrease toward the ion exit 524, resulting in an increasingly dominant quadrupole field as one moves in the axial direction from the ion entrance 520 to the ion exit 524 (see FIG. 4 and accompanying description above). Such an RF electric field profile provides a broad-based pseudo-potential well for capturing ions of a larger emittance at the ion entrance 520, and a narrow-based pseudo-potential well for better compressing of the ion beam diameter (and associated beam phase space) at the ion exit 524 (see FIG. 1 and accompanying description above). Hence, the RF electric field generated by the electrode structure of the ion guide 500 focuses the ions as a converging ion beam 528, as schematically depicted in FIG. 5B.

Figure 6A:
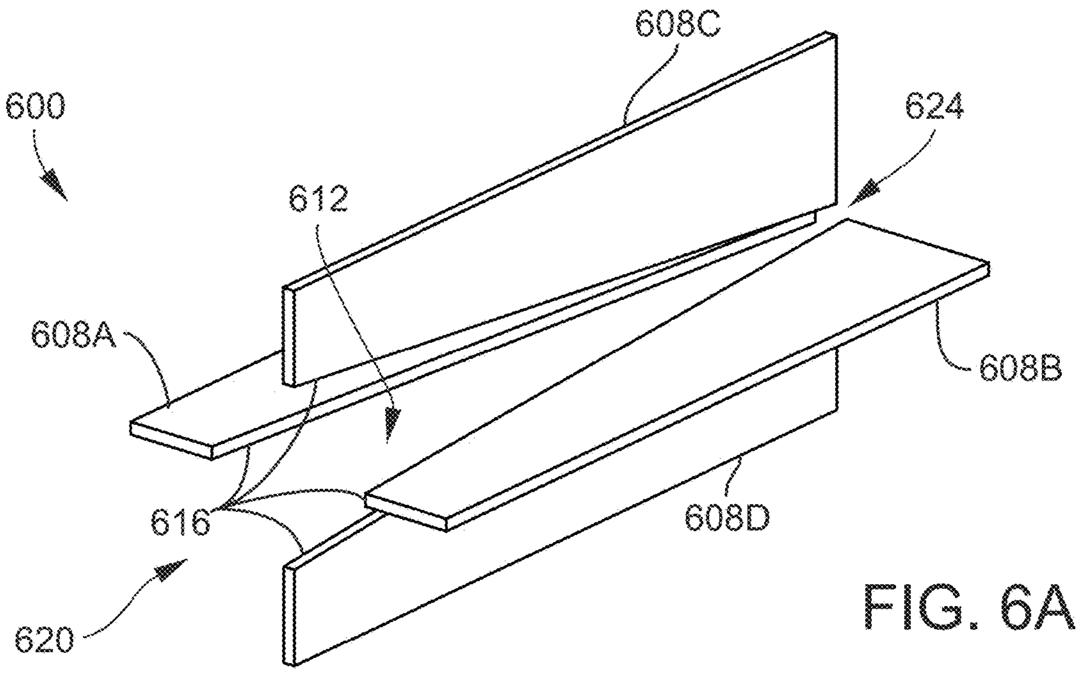
FIG. 6A is a schematic perspective view of an example of an ion guide of rectilinear geometry according to another embodiment of the present disclosure.
Figure 6B:
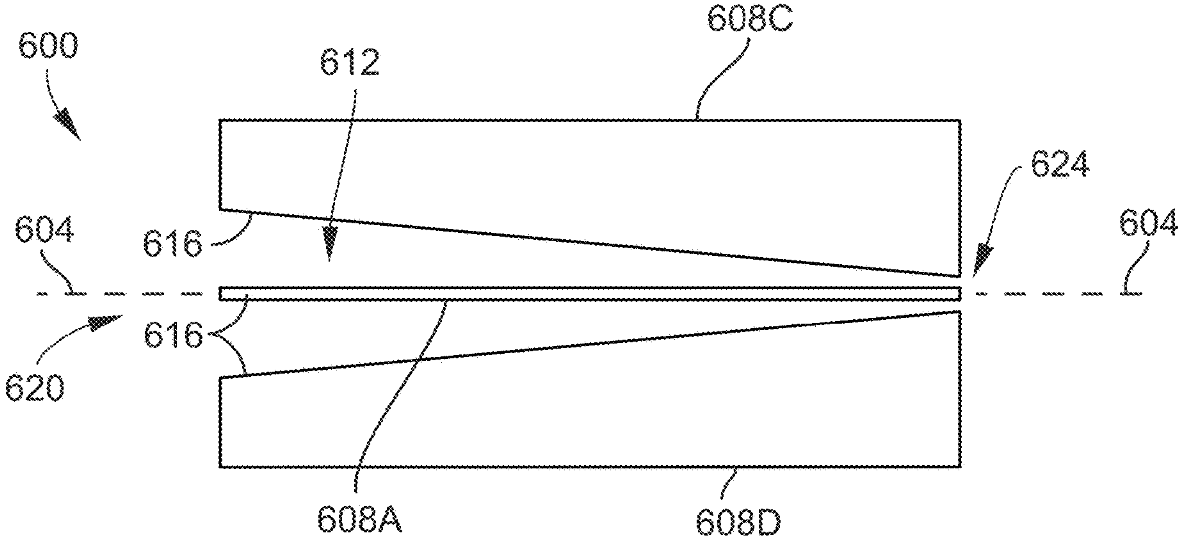
FIG. 6B is a schematic side (lengthwise) view of the ion guide illustrated in FIG. 6A, with one of the electrodes not shown for clarity.
Figure 6C:
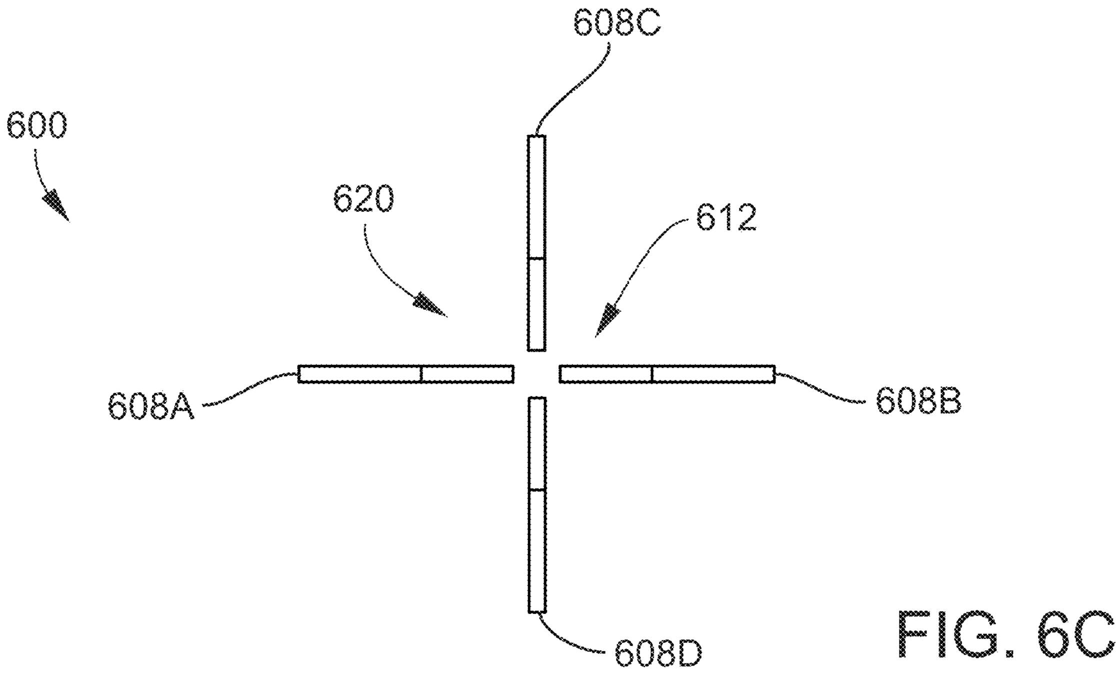
FIG. 6C is a schematic end view of the ion guide illustrated in FIG. 6A at an ion entrance thereof.
Figure 6D:
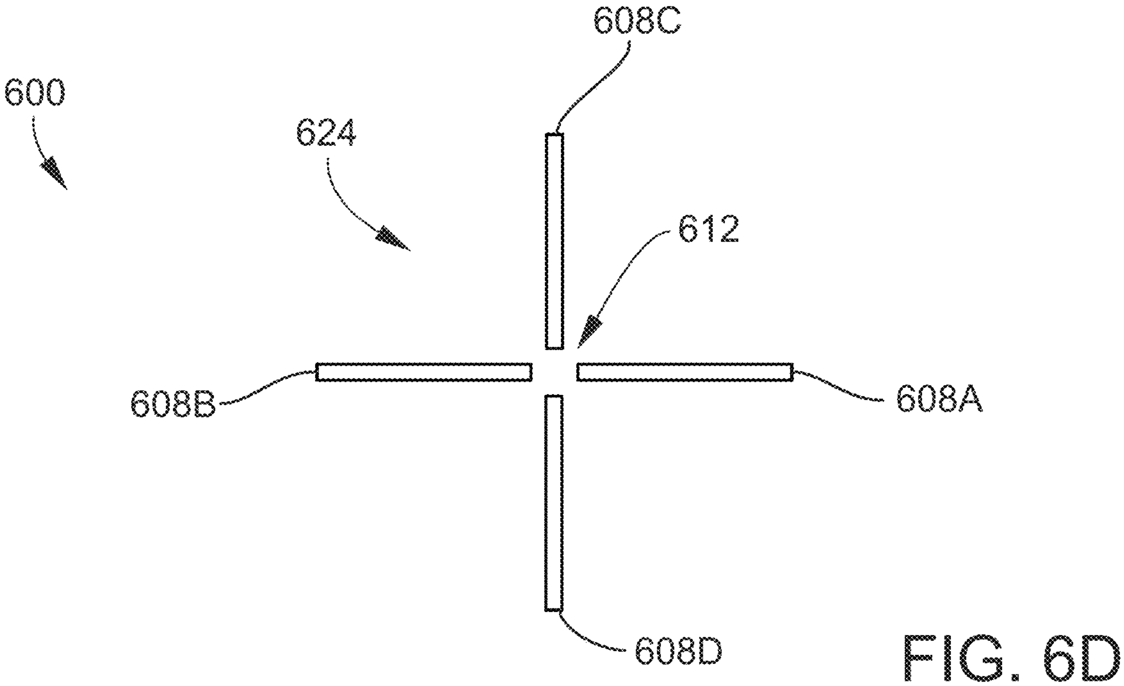
FIG. 6D is a schematic end view of the ion guide illustrated in FIG. 6A at an ion exit thereof.

FIG. 6A is a schematic perspective view of an example of an ion guide 600 of rectilinear geometry according to another embodiment of the present disclosure. As in the previous examples, the ion guide 600 includes a plurality of ion guide electrodes 608A, 608B, 608C, and 608D elongated along an ion guide axis 604 and circumferentially spaced from each other in the transverse plane around the ion guide axis 604 to surround an axially elongated ion guide interior 612, which extends from an ion entrance (end) 620 to an ion exit (end) 624. The electrodes 608A, 608B, 608C, and 608D have respective inside surfaces 616 facing the ion guide interior 612. FIG. 6B is a schematic side (lengthwise) view of the ion guide 600, with one of the electrodes (608B) not shown for clarity. FIG. 6C is an end view of the ion guide 600 at the ion entrance 620, and FIG. 6D is an end view of the ion guide 600 at the ion exit 624. In the present embodiment, the electrodes 608A, 608B, 608C, and 608D are shaped such that their inside surfaces 616 are angled toward each other relative to the ion guide axis 604, and thus converge toward each other in the axial direction from the ion entrance 620 to the ion exit 624, while the other surfaces or edges of the electrodes 608A, 608B, 608C, and 608D are parallel or orthogonal to the ion guide axis 604. In comparison, in the embodiment illustrated in FIGS. 5A-5D, the entire structure of the electrodes 508A, 508B, 508C, and 508D are tilted toward each other.

Another difference between the ion guide 500 illustrated in FIGS. 5A-5D and the ion guide 600 illustrated in FIGS. 6A-6D relates to the electrode width W of the inside surfaces 516 and 616 of the respective sets of electrodes 508A/508B/508C/508D and 608A/608B/608C/608D. The electrode width W in the ion guide 500 is relatively wide, while in the ion guide 600 is relatively narrow. As a further option and as illustrated, the electrode width W in the ion guide 500 may be greater than the radial height of each electrode 508A, 508B, 508C, and 508D. By comparison, the electrode width W in the ion guide 600 may be less than the radial height of each electrode 608A, 608B, 608C, and 608D. The foregoing features may be reversed as between the two embodiments. That is, the electrodes 508A/508B/508C/508D of the ion guide 500 may have a narrow electrode width W, or the electrodes 608A/608B/608C/608D may have a wide electrode width W.

Apart from the foregoing, the configuration illustrated in FIGS. 6A-6D generally may be the same as or similar to that described above and illustrated in FIGS. 5A-5D. Namely, the inscribed radius $r_0$ of the electrodes 608A, 608B, 608C, and 608D gradually decreases along the ion guide axis 604, while the electrode width W (at least of the inside surfaces 616) remains constant and the circumferential gap between adjacent electrodes 608A, 608B, 608C, and 608D gradually decreases along the ion guide axis 604. Consequently, as described above, the aspect ratio increases in the axial dimension, whereby in operation, the higher order (e.g., N>2) multipole components of the generated RF electric field are greater at the ion entrance 620 and gradually decrease toward the ion exit 624, resulting in a compressed (and converging in the present example) ion beam.

Figure 7A:
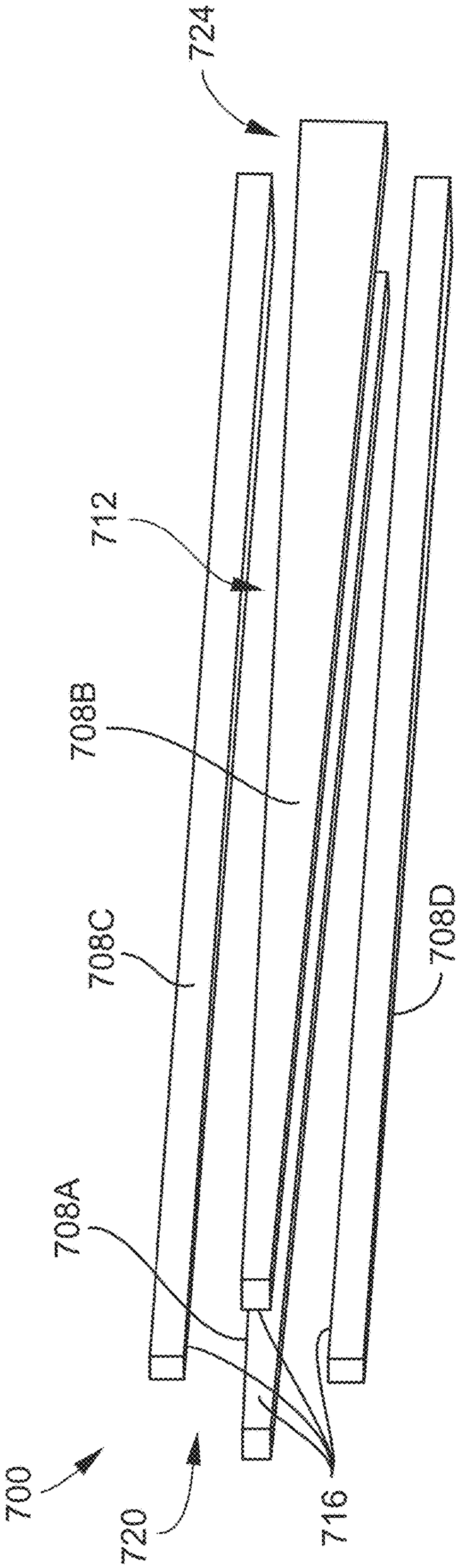
FIG. 7A is a schematic perspective view of an example of an ion guide of rectilinear geometry according to another embodiment of the present disclosure.
Figure 7B:
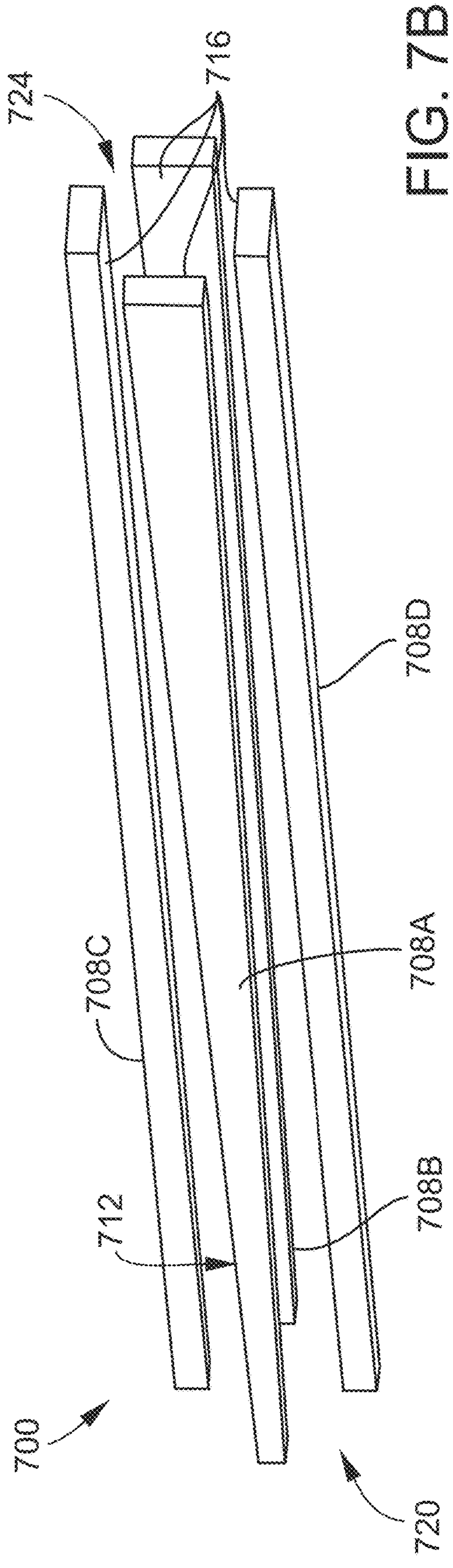
FIG. 7B is another schematic perspective view of the ion guide illustrated in FIG. 7A.
Figure 7C:
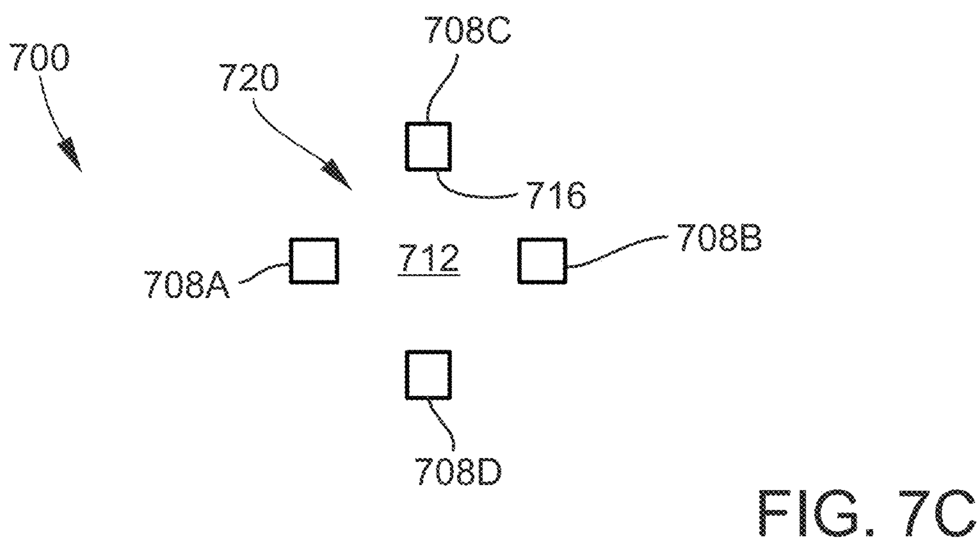
FIG. 7C is an end view of the ion guide illustrated in FIG. 7A at an ion entrance thereof.
Figure 7D:
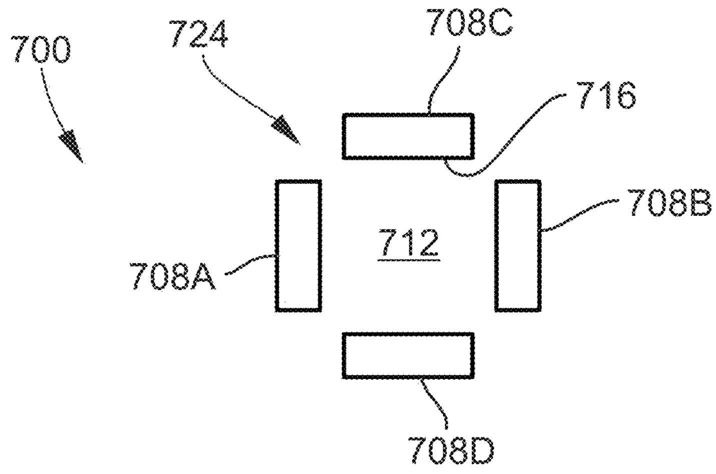
FIG. 7D is an end view of the ion guide illustrated in FIG. 7A at an ion exit thereof.

FIG. 7A is a schematic perspective view of an example of an ion guide 700 of rectilinear geometry according to another embodiment the present disclosure. FIG. 7B is another schematic perspective view of the ion guide 700. As in the previous examples, the ion guide 700 includes a plurality of ion guide electrodes 708A, 708B, 708C, and 708D elongated along an ion guide axis and circumferentially spaced from each other in the transverse plane around the ion guide axis to surround an axially elongated ion guide interior 712, which extends from an ion entrance (end) 720 to an ion exit (end) 724. The electrodes 708A, 708B, 708C, and 708D have respective inside surfaces 716 facing the ion guide interior 712. FIG. 7C is an end view of the ion guide 700 at the ion entrance 720, and FIG. 7D is an end view of the ion guide 700 at the ion exit 724. In the present embodiment, the electrodes 708A, 708B, 708C, and 708D are parallel with the ion guide axis, such that the inscribed radius $r_0$ of the electrodes 708A, 708B, 708C, and 708D remains constant along the axial length of the ion guide 700. However, the electrode width W (at least of the inside surfaces 716) varies in the axial dimension. Specifically, in the illustrated embodiment, the electrode width W (in particular that of the inside surfaces 716) increases in the direction from the ion entrance 720 to the ion exit 724. Consequently, the aspect ratio increases in the axial dimension, thereby in operation varying the multipole composition of the generated RF electric field as described above, resulting in a compressed (and converging in the present example) ion beam.

Figure 8:
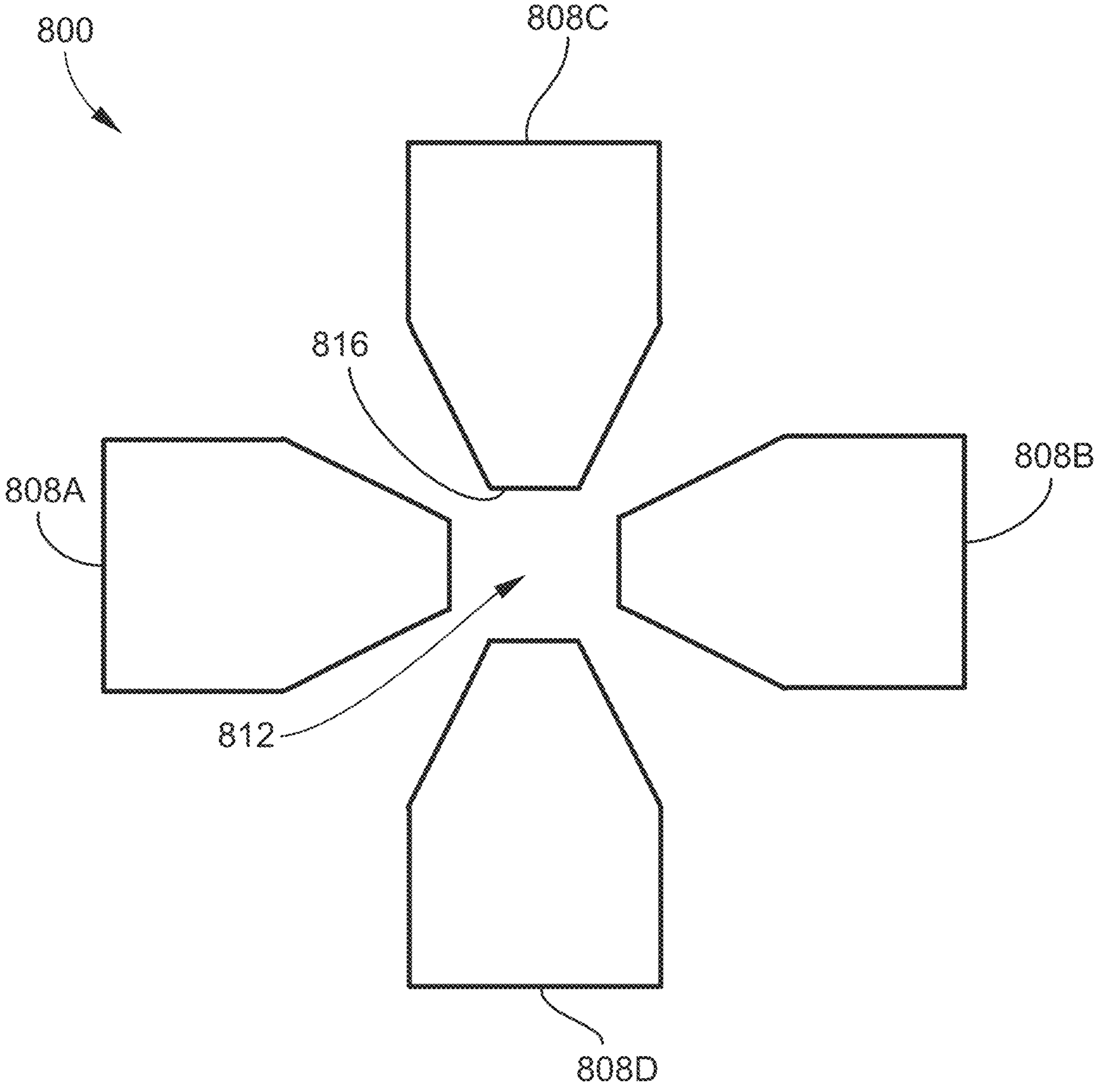
FIG. 8 is a schematic cross-sectional view of an example of an ion guide of rectilinear geometry according to another embodiment of the present disclosure.

FIG. 8 is a schematic cross-sectional view of an example of an ion guide 800 of rectilinear geometry according to another embodiment the present disclosure. As in the previous examples, the ion guide 800 includes a plurality of ion guide electrodes 808A, 808B, 808C, and 808D elongated along an ion guide axis and circumferentially spaced from each other in the transverse plane around the ion guide axis to surround an axially elongated ion guide interior 812, which extends from an ion entrance (end) to an ion exit (end). The electrodes 808A, 808B, 808C, and 808D have respective inside surfaces 816 facing the ion guide interior 812. The electrode width W of the inside surfaces 816 and the radius $r_0$ inscribed by them may be constant or varied along the axial dimension (into the drawing sheet) as desired to vary the aspect ratio according to a predetermined function or pattern as described herein. Apart from the foregoing, the cross-sectional area of the electrodes 808A, 808B, 808C, and 808D in the transverse plane generally may have any shape desired, such as a complex or irregular polygon or combination of polygonal and rounded features. Such a cross-sectional shape may serve a desired function or purpose in addition to realizing an axially varying aspect ratio. In the present embodiment, for example, the cross-sectional shape of each electrode 808A, 808B, 808C, and 808D is a combination of a rectilinear section and a trapezoidal section, with the inside edge of the trapezoidal section corresponding to the inside surface 816 having the predefined electrode width W as described herein. Such a cross-sectional shape may provide an advantage such as, for example, enhance the rigidity and/or simplify the manufacturing of the electrodes 808A, 808B, 808C, and 808D.

In any of the ion guides described herein, as the geometry of the ion guide electrodes, in particular the aspect ratio, varies in the axial dimension, the amount of heat deposited by the RF electric field into the ion beam (i,e., RF heating) will also vary in the axial dimension. For example, if the aspect ratio increases in the direction from the ion entrance to the ion exit to converge the ion beam, the amount of heat deposited will increase correspondingly and potentially violate the adiabatic condition described above. According to an aspect of the present disclosure, in any embodiment of the ion guides disclosed herein, the amplitude of the RF potentials applied to the ion guide electrodes may vary in the axial dimension in a manner that in effect (substantially) matches the variance of the aspect ratio and thereby prevents violating the adiabatic condition. In other words, the RF voltage amplitude may vary according to a predetermined function that (substantially) maintains an approximate adiabatic condition along the device axis. For example, in the case of the aspect ratio increasing in the direction from the ion entrance to the ion exit, the amplitude of the applied RF potentials may be gradually decreased correspondingly in the same direction to offset the effect of the varying aspect ratio on RF heating. In an embodiment, the function according to which the RF voltage amplitude varies may be constructed so as to meet at least one of (one or both of) the following conditions: the low-mass cutoff value $m_L$ exhibited by the ion guide is maintained constant within a range of +/−1 amu while ions are transported through the ion guide; and/or the standard deviation $\sigma$ of the kinetic energy K of ions traveling in the ion guide (e.g., in the radial direction) is maintained below 0.1 electron volt (eV) at least in a second half axial length of the ion guide toward the ion exit end (i.e., the half section of the ion guide that terminates at the ion exit end).

Additionally, the DC potentials may be gradually decreased from entrance to exit to establish an axial DC potential difference or gradient to keep ions moving forward, particularly when the ion guide is part of a pressurized device such as a collision cell. The axial DC electrical field generated in the ion guide interior adds energy to the ions by an amount effective for increasing or at least maintaining the kinetic energy of the ions in a forward direction from the ion entrance end to the ion exit end.

Thus, according to an aspect of the present disclosure, the ion guide (in particular the ion guide electrodes) is configured to generate an RF ion confining electric field of axially varying (in particular gradually varying) RF amplitude. According to another aspect of the present disclosure, the ion guide (in particular the ion guide electrodes) is configured to generate a DC electric field of axially varying (in particular gradually varying) DC magnitude.

Figure 9A:
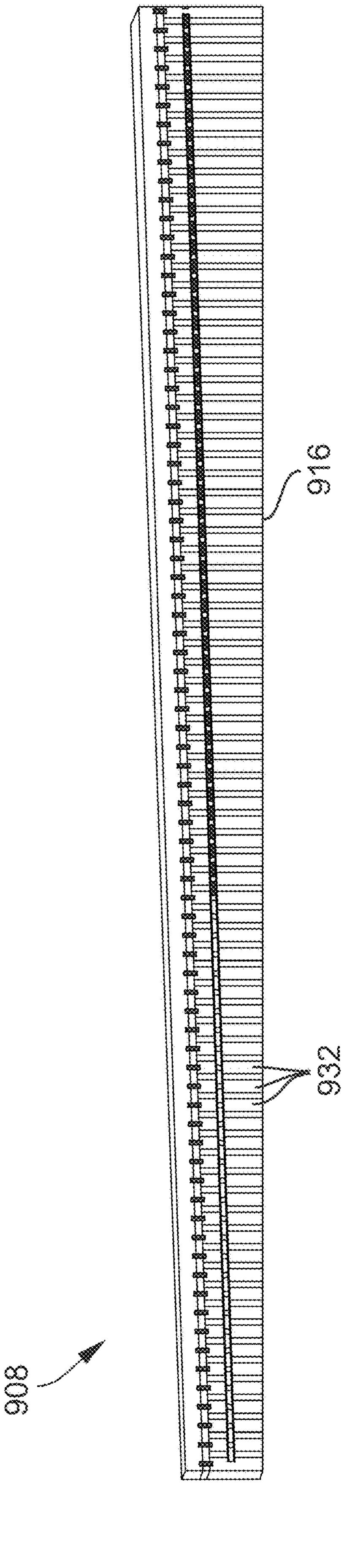
FIG. 9A is a schematic perspective view of an example of an ion guide electrode according to an embodiment of the present disclosure.
Figure 9B:
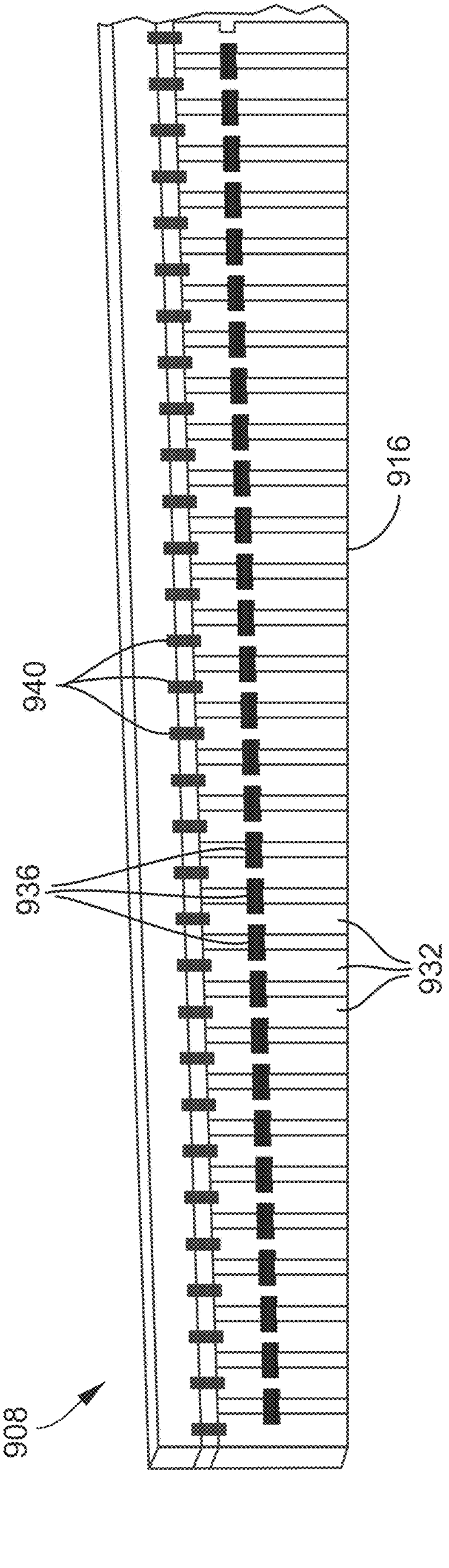
FIG. 9B is a schematic perspective view of a section of the ion guide electrode illustrated in FIG. 9A.

FIG. 9A is a schematic perspective view of an example of an ion guide electrode 908 according to another embodiment of the present disclosure. FIG. 9B is a schematic perspective view of a section of the ion guide electrode 908. A plurality of such electrodes 908 may be provided in any of the ion guides disclosed herein, with inside surfaces 916 facing the ion guide interior. The electrode 908 includes a plurality of conductive electrode sections 932 axially spaced from each other and configured to apply the RF voltage of the two-dimensional RF electric field at successively varying RF voltage amplitude values, for example gradually decreasing RF voltage amplitude values in the direction from the ion entrance to the ion exit of the ion guide. Additionally, the plurality of conductive electrode sections 932 may be configured to apply a DC voltage at successively varying DC voltage magnitude values, for example gradually decreasing DC voltage magnitude values in the direction from the ion entrance to the ion exit. The axially spaced electrode sections 932 may be realized in any suitable manner. As one non-limiting example, the electrode 908 may be plated with a thin metallic layer that is cut into a plurality of strips axially spaced from each other and oriented orthogonal to the ion guide axis, and which serve as the electrode sections 932. The electrode sections 932 (here, the illustrated strips) may be electrically isolated from each other except for being connected through resistors 936 and capacitors 940 to receive predefined RF and DC voltage potentials.

The electrode 908 of the present embodiment has advantages over known electrodes with resistive coating. Electrodes with resistive coating are prone to structural deformation caused by heating when AC/DC current passes through resistive materials. The structural deformation can distort the electric field and result in degraded performance of the ion guide and any device of which it is a part, such as a collision cell. The electrode 908 of the present embodiment avoids the use of or need for resistive coating, and hence is expected to improve the robustness and performance of the ion guide.

For simplicity, the various embodiments of ion guides described thus far have straight axial geometries. It will be understood, however, that any of the embodiments described herein may be modified to have a bent or curved geometry, for example may be U-shaped, C-shaped, S-shaped, etc. Such embodiments are also considered herein to be linear multipole ion guides, as their axial length (whether curved or straight) is typically much greater than their inscribed field radius $r_0$, and they provide a two-dimensional, ion confining RF electric field between electrodes elongated along the axis of the ion guide.

Figure 10:
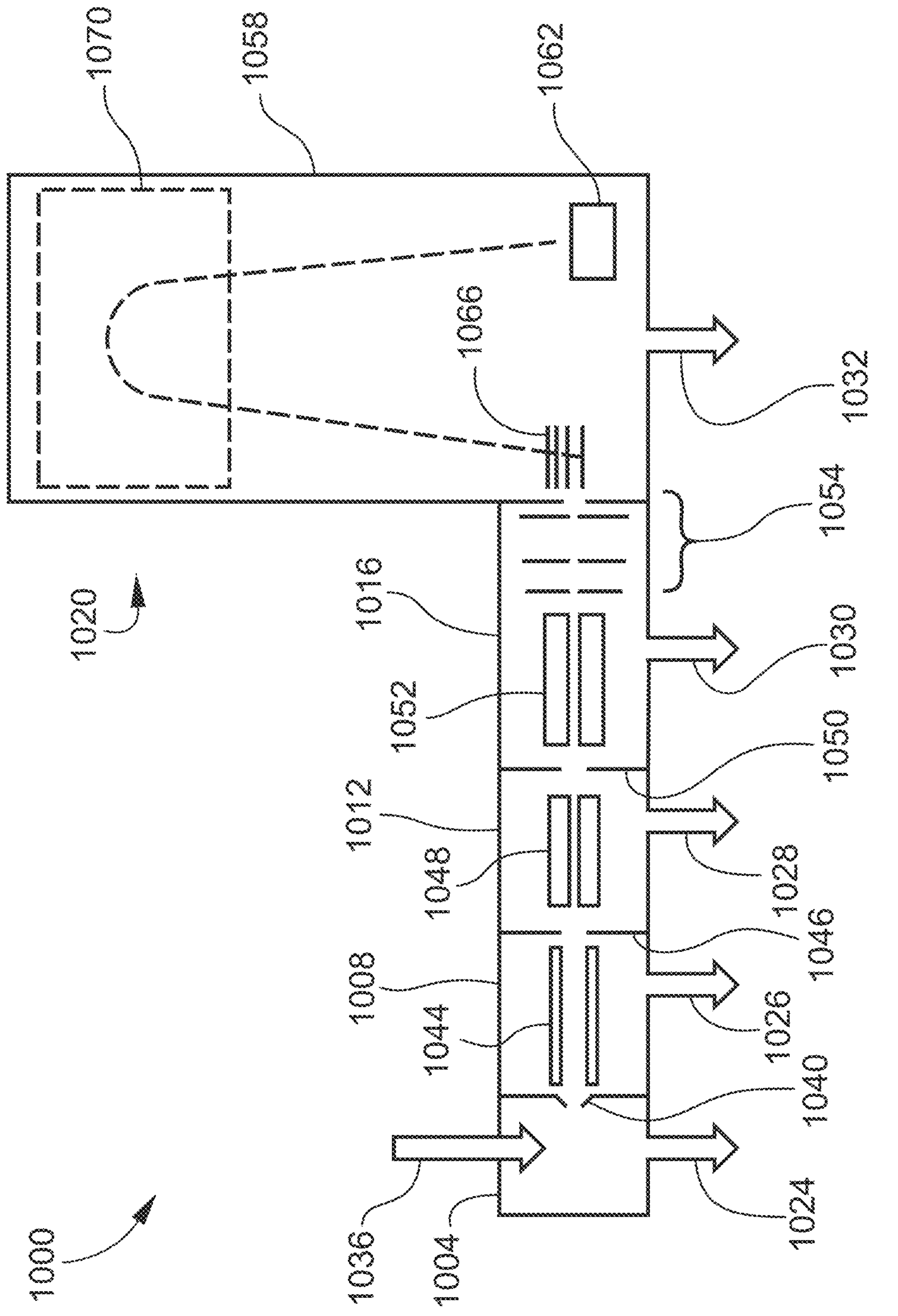
FIG. 10 is schematic view of an example of a mass spectrometry (MS) system according to the present disclosure.

FIG. 10 is a schematic view of an example of a mass spectrometry (MS) system 1000 according to the present disclosure. The MS system 1000 may include one or more ion guides according to any of the embodiments described herein. The operation and design of various components of mass spectrometry systems are generally known to persons skilled in the art and thus need not be described in detail herein. Instead, certain components are briefly described to facilitate an understanding of the subject matter presently disclosed.

The MS system 1000 may generally include an ion source 1004, one or more ion transfer devices 1008, 1012, and 1016 (or ion processing devices), and a (final) mass analyzer 1020. Three ion transfer devices 1008, 1012, and 1016 are illustrated by example only, as other embodiments may include more than three, less than three, or none. The MS system 1000 includes a plurality of chambers defined by one or more housings (enclosures), and arranged in series such that each chamber communicates with at least one adjacent (upstream or downstream) chamber. Each of the ion source 1004, ion transfer devices 1008, 1012, and 1016, and mass analyzer 1020 includes at least one of these chambers. Thus, the MS system 1000 defines a flow path for ions and gas molecules generally from the chamber of the ion source 1004, through the chambers of the ion transfer devices 1008, 1012, and 1016, and into the chamber of the mass analyzer 1020. From the perspective of FIG. 10, the flow path is generally directed from the left to the right. Each chamber is physically separated from an adjacent chamber by at least one structural boundary, e.g., a wall. The wall includes at least one opening to accommodate the flow path. The wall opening may be quite small relative to the overall dimensions of the chambers, thus serving as a gas conductance barrier that limits transfer of gas from a preceding chamber to a succeeding chamber and facilitates independent control of respective vacuum levels in adjacent chambers. The wall may serve as an electrode or ion optics component. Alternatively or additionally, electrodes and/or ion optics components may be mounted to or positioned proximate to the wall. Any of the chambers may include one or more ion guides, such as a linear multipole ion guide (e.g., quadrupole, hexapole, octopole, etc.) or an ion funnel. One or more of the chambers may include an ion guide configured as disclosed herein.

At least some of the chambers may be considered to be pressure-reducing chambers, or vacuum stages, that operate at controlled, sub-atmospheric internal gas pressures. For this purpose the MS system 1000 includes a vacuum system communicating with vacuum ports of such chambers. In the illustrated embodiment, each of the ion source 1004, ion transfer devices 1008, 1012, and 1016, and mass analyzer 1020 includes at least one chamber having a respective vacuum port 1024, 1026, 1028, 1030, and 1032 that communicates with a vacuum system. Generally, when the MS system 1000 is operated to analyze a sample, each chamber successively reduces the gas pressure below the level of the preceding chamber, ultimately down to the very low vacuum-level required for operating the mass analyzer 1020 (e.g., ranging from $10^{-4}$ to $10^{-9}$ Torr). In FIG. 10, the vacuum ports 1024, 1026, 1028, 1030, and 1032 are schematically represented by wide arrows. The vacuum system as a whole is schematically represented by these wide arrows, with the understanding that the vacuum system includes vacuum lines leading from the vacuum ports 1024, 1026, 1028, 1030, and 1032 to one or more vacuum-generating pumps and associated plumbing and other components as appreciated by persons skilled in the art. In operation, one or more of the vacuum ports 1024, 1026, 1028, 1030, and 1032 may remove non-analyte neutral molecules from the ion path through the MS system 1000.

The ion source 1004 may be any type of continuous-beam or pulsed ion source suitable for producing analyte ions for mass spectral analysis. Examples of ion sources 1004 include, but are not limited to, electrospray ionization (ESI) sources, photo-ionization (PI) sources, electron ionization (EI) sources, chemical ionization (CI) sources, field ionization (FI) sources, plasma or corona discharge sources, laser desorption ionization (LDI) sources, and matrix-assisted laser desorption ionization (MALDI) sources. Some of the examples just noted are, or may optionally be, atmospheric pressure ionization (API) sources in that they operate exclusively at or near atmospheric pressure such as ESI sources, or may be configured to do so, such as atmospheric pressure photo-ionization (APPI) sources and atmospheric pressure chemical ionization (APCI) sources. An API source nonetheless includes a vacuum port 1024 (exhaust port) by which gas, contaminants, etc. may be removed from the chamber. The chamber of the ion source 1004 is an ionization chamber in which sample molecules are broken down to analyte ions by an ionization device (not shown). The sample to be ionized may be introduced to the ion source 1004 by any suitable means, including hyphenated techniques in which the sample is an output 136 of an analytical separation instrument such as, for example, a gas chromatography (GC) or liquid chromatography (LC) instrument (not shown). The ion source 1004 may include a skimmer 1040 (or two or more skimmers axially spaced from each other), also referred to as a skimmer plate, skimmer cone, or sampling cone. The skimmer 1040 has a central aperture. The skimmer 1040 is configured for preferentially allowing ions to pass through to the next chamber while blocking non-analyte components. The ion source 1004 may also include other components (electrodes, ion optics, etc., not shown) useful for organizing as-produced ions into a beam that may be efficiently transferred into the next chamber.

In some embodiments, the first ion transfer device 1008 may be configured primarily as a pressure-reducing stage. For this purpose, the ion transfer device 1008 may include ion transfer optics 1044 configured for keeping the ion beam focused along a main optical axis of the MS system 1000. The ion transfer optics 1044 may have various configurations known to persons skilled in the art, such as, for example, a multipole arrangement of electrodes elongated along the axis (e.g., a multipole ion guide), a serial arrangement of ring electrodes, an ion funnel, a split cylinder electrode, etc. In some embodiments, the ion transfer optics 1044 may be configured as an ion trap. One or more lenses 1046 may be positioned between the ion transfer device 1008 and the adjacent ion transfer device 1012.

In some embodiments, the second ion transfer device 1012 may be configured as a mass filter or an ion trap configured for selecting ions of a specific m/z ratio or m/z ratio range. For this purpose, the ion transfer device 1008 may include ion transfer optics 1048 such as a multipole arrangement of electrodes (e.g., a quadrupole mass filter). One or more lenses 1050 may be positioned between the ion transfer device 1012 and the adjacent ion transfer device 1016. In other embodiments, the ion transfer device 1012 may be configured primarily as a pressure-reducing stage.

In some embodiments, the third ion transfer device 1016 may be configured as a cooling cell or collision cell. For this purpose, the ion transfer device 1016 may include ion transfer optics 1052 such as a multipole arrangement of electrodes, configured as a non-mass-resolving, RF-only device. A cooling gas (or damping gas) such as, for example, argon, nitrogen, helium, etc., may be flowed into the chamber of the ion transfer device 1016 to cool down (or "thermalize," i.e., reduce the kinetic energy of) the ions during operation in the analytical mode by way of collisions between the ions and the gas molecules. In other embodiments, the ion transfer device 1016 may be configured as an ion fragmentation device such as a collision cell. In one example, ion fragmentation is accomplished by way of collision induced dissociation (CID), in which case the gas added to the chamber (the "collision gas") results in a gas pressure sufficient to enable fragmentation by CID. In an embodiment, the ion transfer device 1016 includes an ion guide as disclosed herein. In an embodiment, the an ion guide or other ion transfer optics 1052 is enclosed in a housing having a cell entrance, cell exit spaced from the cell entrance along the longitudinal axis of the cooling or collision cell (of the third ion transfer device 1016), and a gas supply port communicating with an interior of the housing for admitting the collision gas. Ion beam shaping optics 1054 may be positioned between the ion transfer device 1016 and the MS 1020. In other embodiments, the ion transfer device 1016 may be configured primarily as a pressure-reducing stage.

Thus, in some embodiments, an ion guide as disclosed herein is disposed in an enclosure or housing such as a collision cell configured to maintain the ion guide interior at a pressure effective to thermalize the ions in the ion guide interior, or further to fragment at least some of the ions in the ion guide interior, particularly in preparation for acquiring fragment ion spectra as appreciated by persons skilled in the art. In some embodiments, the ion guide interior is maintained or held at a pressure in a range from $5\times10^{-2}$ Torr to $1\times10^{-8}$ Torr.

The mass analyzer 1020 may be any type of mass analyzer, and includes an ion detector 1062. In the illustrated embodiment, by example only, the mass analyzer 1020 is depicted as a time-of-flight mass spectrometer (TOF) analyzer. In this case, the mass analyzer 1020 includes an evacuated, electric field-free flight tube 1058 into which ions are injected by an ion pulser 1066 (or ion pusher, ion puller, ion extractor, etc.). As appreciated by persons skilled in the art, the beam shaping optics 1054 direct the ion beam into the ion pulser 1066, which pulses the ions into the flight tube 1058 as ion packets. The ions drift through the flight tube 1058 toward the ion detector 1062. Ions of different masses travel through the flight tube 1058 at different velocities and thus have different overall times-of-flight, i.e., ions of smaller masses travel faster than ions of larger masses. Each ion packet spreads out (is dispersed) in space in accordance with the time-of-flight distribution. The ion detector 1062 detects and records the time that each ion arrives at (impacts) the ion detector 1062. A data acquisition device then correlates the recorded times-of-flight with m/z ratios. The ion detector 1062 may be any device configured for collecting and measuring the flux (or current) of mass-discriminated ions output from the mass analyzer 1058. Examples of ion detectors include, but are not limited to, multi-channel plates, electron multipliers, photomultipliers, and Faraday cups. In some embodiments, as illustrated, the ion pulser 1066 accelerates the ion packets into the flight tube 1058 in a direction orthogonal to the direction along which the beam shaping optics 1054 transmit the ions into the ion pulser 1066, which is known as orthogonal acceleration TOF (oa-TOF). In this case, the flight tube 1058 often includes an ion mirror (or reflectron) 1070 to provide an approximately 180° reflection or turn in the ion flight path for extending the flight path and correcting the kinetic energy distribution of the ions.

In other embodiments, the mass analyzer 1020 may be another type of mass analyzer such as, for example, a mass filter, an ion trap, an ion cyclotron resonance (ICR) cell, an electrostatic ion trap, or a static electric and/or magnetic sector analyzer.

In operation, a sample is introduced to the ion source 1004. The ion source 1004 produces sample ions (analyte ions and background ions) from the sample and transfers the ions to one or more ion transfer devices 1008, 1012, and 1016. The ion transfer device(s) 1008, 1012, and 1016 transfer the ions through one or more pressure-reducing stages and into the mass analyzer 1020. Depending on what type or types of ion transfer devices 1008, 1012, and 1016 are included, the ion transfer device(s) 1008, 1012, and 1016 may perform additional ion processing operations such as mass filtering, ion fragmentation, beam shaping, etc., as described above. Moreover, one or more of the ion transfer devices 1008, 1012, and 1016 may include an ion guide configured and operated according to any of the embodiments described herein. The mass analyzer 1020 mass-resolves the ions as described above. The measurement signals output from the ion detector 1062 are processed by electronics of the MS system 1000 to produce mass spectra.

EXEMPLARY EMBODIMENTS

Exemplary embodiments provided in accordance with the presently disclosed subject matter include, but are not limited to, the following:

1. An ion guide, comprising: an ion entrance end; an ion exit end; and a plurality of electrodes elongated along an ion guide axis from the ion entrance end to the ion exit end and spaced from each other around the ion guide axis to surround an ion guide interior, the electrodes comprising polygonal shapes with respective inside surfaces disposed at a radius from the ion guide axis, wherein: the inside surfaces inscribe a circle on the ion guide axis having the radius; the inside surfaces have respective electrode widths tangential to the circle; an aspect ratio of the electrode width to the radius varies along the ion guide axis; and the plurality of electrodes is configured to generate a two-dimensional RF electric field on the transverse plane orthogonal to the axis in the ion guide interior, the RF electric field comprising a superposition of a lower-order multipole component and a higher-order multipole component wherein an amplitude ratio of the lower-order component to the higher-order component varies along the ion guide axis in accordance with the varying aspect ratio, and the RF electric field having an RF voltage amplitude that varies along the ion guide axis.
2. The ion guide of embodiment 1, wherein the aspect ratio increases along the ion guide axis in a forward direction from the ion entrance end to the ion exit end for converging an ion beam in the forward direction.
3. The ion guide of any of the preceding embodiments, wherein the electrodes are tilted toward the ion guide axis such that the radius varies along the ion guide axis.
4. The ion guide of any of the preceding embodiments, wherein the inside surfaces are tapered toward the ion guide axis such that the radius varies along the ion guide axis.
5. The ion guide of any of the preceding embodiments, wherein the radius decreases along the ion guide axis.
6. The ion guide of any of the preceding embodiments, wherein the width of each electrode is constant along the ion guide axis.
7. The ion guide of any of embodiments 1-5, wherein the electrodes are tapered such that the width of each electrode varies along the ion guide axis.
8. The ion guide of any of embodiments 1-5, wherein the width of each electrode increases along the ion guide axis.
9. The ion guide of any of embodiments 1-4, 6, and 7, wherein the radius is constant along the ion guide axis.
10. The ion guide of any of the preceding embodiments, wherein the inside surfaces are flat.
11. The ion guide of any of the preceding embodiments, wherein the amplitude ratio varies according to at least one of: the amplitude ratio increases in the direction from the ion entrance end to the ion exit end; the amplitude ratio decreases in a direction from the ion entrance end to the ion exit end.
12. The ion guide of any of the preceding embodiments, wherein the lower-order multipole component comprises at least one of: a quadrupole component; a hexapole component; an octopole component.
13. The ion guide of any of the preceding embodiments, wherein the RF voltage amplitude decreases along the ion guide axis in a forward direction from the ion entrance end to the ion exit end.
14. The ion guide of any of the preceding embodiments, wherein the RF voltage amplitude varies according to a function that maintains an approximate adiabatic condition along the device axis defined by at least one of: a low-mass cutoff value is maintained constant within a range of +/−1 amu; a kinetic energy standard deviation of ions is maintained below 0.1 eV at least in a second half axial length of the ion guide toward the ion exit end.
15. The ion guide of any of the preceding embodiments, wherein the aspect ratio increases along the ion guide axis in a forward direction from the ion entrance end to the ion exit end, and the RF voltage amplitude decreases along the ion guide axis in the forward direction.
16. The ion guide of any of the preceding embodiments, wherein the plurality of electrodes has a 2N-fold rotational symmetry about the ion guide axis from the ion entrance end to the ion exit end, where N is an integer equal to or greater than 2.
17. The ion guide of any of the preceding embodiments, wherein the plurality of electrodes is 2N, where N is an integer equal to or greater than 2.
18. The ion guide of any of the preceding embodiments, wherein the plurality of electrodes is four.
19. The ion guide of any of embodiments 1-17, wherein the plurality of electrodes is greater than four.
20. The ion guide of any of the preceding embodiments, wherein the plurality of electrodes is configured to generate an axial DC electrical field in the ion guide interior effective for increasing or maintaining the kinetic energy of ions in a forward direction from the ion entrance end to the ion exit end.
21. The ion guide of any of the preceding embodiments, wherein each of the electrodes comprises a plurality of conductive electrode sections axially spaced from each other and configured to apply the RF voltage of the two-dimensional RF electrical field at successively varying RF voltage amplitude values.
22. The ion guide of embodiment 21, wherein the plurality of conductive electrode sections is configured to apply a DC voltage at successively varying DC voltage magnitude values.
23. The ion guide of any of the preceding embodiments, comprising an RF voltage source communicating with the plurality of electrodes and configured to apply an RF voltage potential to the plurality of electrodes.
24. The ion guide of any of the preceding embodiments, comprising a DC voltage source communicating with the plurality of electrodes and configured to apply a DC voltage potential to the plurality of electrodes.
25. A method for transporting ions, the method comprising: applying an RF voltage potential to the plurality of electrodes of an ion guide configured according to any of the embodiments disclosed herein, to generate the two-dimensional RF electrical field in the ion guide interior; and admitting the ions into the ion guide interior to subject the ions to the two-dimensional RF electrical field and radially confine the ions to an ion beam along the ion guide axis.
26. The ion guide of embodiment 25, wherein the two-dimensional RF electrical field is effective to converge the ion beam in a forward direction from the ion entrance end to the ion exit end.
27. The ion guide of any of the preceding embodiments, comprising applying a DC voltage potential to the plurality of electrodes to generate an axial DC electrical field in the ion guide interior effective to increase or maintain the kinetic energy of the ions in a forward direction from the ion entrance end to the ion exit end.

28. The ion guide of any of the preceding embodiments, comprising maintaining the ion guide interior at a pressure in a range from $5\times10^{-2}$ Torr to $1\times10^{-8}$ Torr.
29. The ion guide of any of the preceding embodiments, comprising maintaining the ion guide interior at a pressure effective to thermalize the ions in the ion guide interior.
30. The ion guide of any of the preceding embodiments, comprising maintaining the ion guide interior at a pressure effective to fragment at least some of the ions in the ion guide interior.
31. A collision cell, comprising: a housing; and an ion guide according to any of the preceding embodiments disposed in the housing.
32. A mass spectrometry (MS) system, comprising: an ion guide according to any of the preceding embodiments; and a mass analyzer communicating with the ion guide.
33. A mass spectrometry (MS) system, comprising: an ion guide according to any of the preceding embodiments; and a controller comprising an electronic processor and a memory, and configured to control the steps of a method according to any of the preceding embodiments, in particular to control an operation of the ion guide.
34. A method for analyzing a sample, the method comprising: producing analyte ions from the sample; transmitting the analyte ions into an ion guide according to any of the preceding embodiments; and operating the ion guide according to any of the preceding embodiments.
35. An ion guide, comprising: an ion entrance end; an ion exit end; and a plurality of electrodes elongated along an ion guide axis from the ion entrance end to the ion exit end and spaced from each other around the ion guide axis to surround an ion guide interior, the electrodes comprising polygonal shapes with respective inside surfaces disposed at a radius from the ion guide axis, wherein: the inside surfaces inscribe a circle on the ion guide axis having the radius; the inside surfaces have respective electrode widths tangential to the circle; and an aspect ratio of the electrode width to the radius varies along the ion guide axis.
36. The ion guide of embodiment 35, comprising one or more features according to any of embodiments 1-34.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An ion guide, comprising:
an ion entrance end;
an ion exit end; and
a plurality of electrodes,
wherein at least one electrode of the plurality of electrodes is elongated along an ion guide axis from the ion entrance end to the ion exit end,
wherein the at least one electrode of the plurality of electrodes includes a cross-section that includes a quadrilateral shape,
wherein a size of the cross-section increases at a constant taper along the ion guide axis from the ion extrance end to the ion exit end,
wherein the plurality of electrodes are spaced from each other around the ion guide axis to surround an ion guide interior,
wherein the plurality of electrodes include inside surfaces that are disposed at a variable radius from the ion guide axis, and
wherein the inside surfaces inscribe a variable circle on the ion guide axis.

2. The ion guide of claim 1, comprising at least one of:
wherein an aspect ratio of an electrode width to the variable radius increases along the ion guide axis in a forward direction from the ion entrance end to the ion exit end for converging an ion beam in the forward direction; or
wherein an RF voltage amplitude of an RF electric field gnerated by the plurality of electrodes decreases along the ion guide axis in the forward direction.

3. The ion guide of claim 1, comprising at least one of:
wherein the electrodes are tilted toward the ion guide axis such that the variable radius varies along the ion guide axis; or
wherein the inside surfaces are tapered toward the ion guide axis such that the variable radius varies along the ion guide axis.

4. The ion guide of claim 1, comprising at least one of:
wherein the variable radius decreases along the ion guide axis; or
wherein a width of each electrode is constant along the ion guide axis.

5. The ion guide of claim 1, comprising at least one of:
wherein the electrodes are tapered such that a width of each electrode varies along the ion guide axis; or
wherein the width of each electrode increases along the ion guide axis.

6. The ion guide of claim 1, wherein the inside surfaces are flat.

7. The ion guide of claim 1, wherein an amplitude ratio associated with an RF electric field generated by the plurality of electrodes and comprising a superposition of a lower-order multipole component and a higher-order multipole component increased in a direction from the ion entrance end to the ion exit end.

8. The ion guide of claim 1, wherein a lower-order multipole component associated with an RF electric field generated by the plurality of electrodes comprises at least one of: a quadrupole component; a hexapole component; or an octopole component.

9. The ion guide of claim 1, wherein an RF voltage amplitude associated with an RF electric field generated by the plurality of electrodes decreases along the ion guide axis in a forward direction from the ion entrance end to the ion exit end.

10. The ion guide of claim 1, wherein an RF voltage amplitude associated with an RF electric field gnenerated by the plurality of electrodes decreases according to a function that maintains an approximate adiabatic condition along the ion guide axis defined by at least one of:

a low-mass cutoff value is maintained constant within a range of +/−1 amu; or a kinetic energy standard deviation of ions is maintained below 0.1 eV at least in a second half axial length of the ion guide toward the ion exit end.

11. The ion guide of claim 1, wherein the plurality of electrodes has a 2N-fold rotational symmetry about the ion guide axis from the ion entrance end to the ion exit end, where N is an integer equal to or greater than 2.

12. The ion guide of claim 1, wherein the plurality of electrodes is 2N, where N is an integer equal to or greater than 2.

13. The ion guide of claim 1, wherein the plurality of electrodes is four, or wherein the plurality of electrodes is greater than four.

14. The ion guide of claim 1, wherein the plurality of electrodes is configured to generate an axial DC electrical field in the ion guide interior effective for increasing or maintaining the kinetic energy of ions in a forward direction from the ion entrance end to the ion exit end.

15. The ion guide of claim 1, wherein each of the electrodes comprises a plurality of conductive electrode sections axially spaced from each other and configured according to at least one of:

the plurality of conductive electrode sections is configured to apply an RF voltage of a two-dimensional RF electrical field generated by the plurality of electrodes at successively varying RF voltage amplitude values; or the plurality of conductive electrode sections is configured to apply a DC voltage at successively varying DC voltage magnitude values.

16. The ion guide of claim 1, comprising at least one of:

an RF voltage source communicating with the plurality of electrodes and configured to apply an RF voltage potential to the plurality of electrodes; or a DC voltage source communicating with the plurality of electrodes and configured to apply a DC voltage potential to the plurality of electrodes.

17. A method for transporting ions, the method comprising:

applying an RF voltage potential to the plurality of electrodes of the ion guide of claim 1 to generate the two-dimensional RF electrical field in the ion guide interior; and admitting the ions into the ion guide interior to subject the ions to the two-dimensional RF electrical field and radially confine the ions to an ion beam along the ion guide axis.

18. The method of claim 17, wherein the two-dimensional RF electrical field is effective to converge the ion beam in a forward direction from the ion entrance end to the ion exit end.

19. The method of claim 17, comprising applying a DC voltage potential to the plurality of electrodes to generate an axial DC electrical field in the ion guide interior effective to increase or maintain the kinetic energy of the ions in a forward direction from the ion entrance end to the ion exit end.

20. The method of claim 17, comprising at least one of:

maintaining the ion guide interior at a pressure in a range from 5×10−2 Torr to 1×10−8 Torr;

maintaining the ion guide interior at a pressure effective to thermalize the ions in the ion guide interior; or maintaining the ion guide interior at a pressure effective to fragment at least some of the ions in the ion guide interior.

* * * * *